US009927563B2

(12) United States Patent
Miyake et al.

(10) Patent No.: US 9,927,563 B2
(45) Date of Patent: Mar. 27, 2018

(54) LIQUID CRYSTAL PANEL AND MANUFACTURING METHOD OF THE SAME

(71) Applicant: NLT TECHNOLOGIES, LTD., Kawasaki, Kanagawa (JP)

(72) Inventors: Tomomi Miyake, Kawasaki (JP); Chikaaki Mizokuchi, Kawasaki (JP)

(73) Assignee: NLT TECHNOLOGIES, LTD., Kawasaki, Kanagawa (JP)

( * ) Notice: Subject to any disclaimer, the term of this patent is extended or adjusted under 35 U.S.C. 154(b) by 741 days.

(21) Appl. No.: 14/509,573

(22) Filed: Oct. 8, 2014

(65) Prior Publication Data

US 2015/0103294 A1 Apr. 16, 2015

(30) Foreign Application Priority Data

Oct. 10, 2013 (JP) ................. 2013-212443

(51) Int. Cl.
 *G02F 1/1333* (2006.01)
 *G02B 5/22* (2006.01)
 *G02B 5/20* (2006.01)
 *G02F 1/13* (2006.01)

(52) U.S. Cl.
 CPC ............... *G02B 5/22* (2013.01); *G02B 5/208* (2013.01); *G02F 1/1309* (2013.01)

(58) Field of Classification Search
 CPC ............ G02F 1/1333; G02F 1/133305; G02F 1/1309; G02B 5/22; G02B 5/208
 USPC ........................................................ 349/158
 See application file for complete search history.

(56) References Cited

U.S. PATENT DOCUMENTS

2009/0213307 A1* 8/2009 Chiu ................. G02F 1/133788
 349/104

FOREIGN PATENT DOCUMENTS

| JP | 2000-89231 A | 3/2000 |
| JP | 2002-98981 A | 4/2002 |
| JP | 2007-65653 A | 3/2007 |
| JP | 2007-171905 A | 7/2007 |

OTHER PUBLICATIONS

Communication dated Aug. 29, 2017 from the Japanese Patent Office in counterpart Application No. 2013-212443.

* cited by examiner

*Primary Examiner* — Nathanael R Briggs
*Assistant Examiner* — William Peterson
(74) *Attorney, Agent, or Firm* — Sughrue Mion, PLLC

(57) ABSTRACT

Provided are a liquid crystal panel and a method of manufacturing method of manufacturing a liquid crystal panel. The liquid crystal panel includes a first transparent substrate; a second transparent substrate; and a liquid crystal layer formed between the first transparent substrate and the second transparent substrate. The first transparent substrate and the second transparent substrate have transparency in a visible light region and an ultraviolet absorptive property. At least one of the first transparent substrate and the second transparent substrate includes a structure arranged in a predetermined region thereof, where the structure transmits ultraviolet rays in a specific wavelength range.

22 Claims, 11 Drawing Sheets

SIZE OF BRIGHT SPOT 17
14
15

POLARIZATION DIRECTION OF UV RAYS 41
TO BE USED FOR IRRADIATION

LIQUID CRYSTAL PANEL AND MANUFACTURING METHOD OF THE SAME

TECHNICAL FIELD

The present invention relates to a liquid crystal panel and a manufacturing method of the same. In particular, the present invention relates to a liquid crystal panel and a manufacturing method of the same, which can lower a visual recognition level of a bright spot that appears as a result of a foreign matter that has remained in the liquid crystal panel, to improve image quality of the liquid crystal panel.

BACKGROUND

Liquid crystal panels are used in a broad range of applications, such as display devices in industrial appliances and medical appliances, not only in television sets and mobile phones. In general, a liquid crystal panel includes: a pair of substrates that face each other; and liquid crystal enclosed between the pair of substrates. In one of the substrates, there are formed thin film transistors for driving respective pixels, and electrodes for applying voltage to the liquid crystal. A thin film formed of an oriented material is applied on the electrodes, and an oriented film that orients the liquid crystal in a certain direction is formed by applying orientation treatment to the thin film. On the other substrate, a color filter layer is formed as necessary. The color filter layer is formed by arranging pixels including pigments of different colors, for example, red, green and blue. Adjacent pixels are partitioned by a light blocking black matrix. A common electrode is formed on the color filter layer as necessary. Furthermore, a thin film formed of an oriented film material, such as polyimide, is applied thereon, and is subjected to orientation treatment, to form an oriented film that orients the liquid crystal to a certain direction.

As one example of the orientation treatment, rubbing treatment can be cited. The rubbing treatment is treatment in which the thin film is rubbed in a predetermined orientation direction with a rubbing roller around which rubbing cloth, which is a friction member, is wound. The thin film that has undergone the rubbing treatment has an orientation regulating capability for orienting liquid crystal in a certain direction. As one example of non-contact orientation treatment, photo-alignment treatment can be cited. The photo-alignment treatment is treatment that provides an orientation regulating capability to the thin film by irradiating the thin film with ultraviolet rays such that chemical bonds of macromolecules in the oriented film material is decomposed, isomerized and dimerized.

After applying orientation treatment to both substrates, a liquid crystal layer is formed between the substrates. There are various techniques to form a liquid crystal layer. One of the techniques includes: applying a sealant on one substrate in a rectangular frame form a part of which is opened; adhering the substrates together; and injecting liquid crystal material between the substrate from the opening. Another technique includes: applying sealant on one substrate in a rectangular frame form; dropping liquid crystal in a region surrounded by the sealant; and thereafter adhering the substrates together. Then, by adhering polarization plates onto the resulting body after forming a liquid crystal layer between the substrates, a liquid crystal panel is completed. The completed liquid crystal panel undergoes a display inspection, so that a liquid crystal panel without a display defect is shipped as a product.

In recent years, the pixel size per unit area of liquid crystal panels has become small as a result of highly minute structures, and thus the number of pixels is increasing. Accordingly, the probability of pixel defect is increasing. Pixel defects in the liquid crystal panel come from breaking and short circuit of wires and electrodes, damages on the surface of the oriented film made by orientation treatment, and residue of foreign matters in the liquid crystal panel, for example. Examples of defects caused by a foreign matter in the liquid crystal panel include: a pixel defect that a foreign matter or a region around the foreign matter is seen darkly when the panel displays a white screen; and another pixel defect that the foreign matter or a region around the foreign matter is seen whitely when the panel displays a black screen. The former is called a dark spot and the latter is called a bright spot.

Here, examples of the operational modes of a liquid crystal panel include: a TN (Twisted Nematic) mode; an IPS (In Plane Switching) mode, and a VA (Vertical Alignment) mode. Among these modes, demands for the IPS mode are increasing because it has a wide viewing angle and changes in tones and colors according to the viewing angle are small.

The IPS mode is a normally black mode where a black screen is displayed when voltage is not applied. Accordingly, when there is a bright spot defect, the bright spot can always be seen because of light of the backlight provided in the liquid crystal panel even if no voltage is applied, and thus image quality is deteriorated. Accordingly, there is an increased importance in modifying the bright spots especially for a liquid crystal panel in the IPS mode.

Consequently, the cause of bright spots has been examined for modifying the bright spots. It turned out that there are two causes of bright spots. First, a bright spot results from transmission or scattering of light in a foreign matter itself. Second, a bright spot results from orientation abnormality of the liquid crystal in the circumference of a foreign matter.

The first bright spot that results from transmission or scattering of light in the foreign matter itself appears because the foreign matter, which has characteristics of transmitting light in the visible light region and/or of scattering light, makes a difference in transmittance from a portion without the foreign matter in a liquid crystal panel. In this case, since a bright spot appears as a result of light passing through the foreign matter itself or scattered in the foreign matter itself, the size of a bright spot is substantially the same as the size of the foreign matter.

The second bright spot that results from orientation abnormality of the liquid crystal in the circumference of the foreign matter appears because a foreign matter, which is organic substance, makes a difference in light transmittance from a portion without the foreign matter in a liquid crystal panel, due to occurrence of orientation abnormality coming from interaction of liquid crystal molecules in the circumference of the foreign matter with molecular chains on the surface of the foreign matter.

Usually, liquid crystal molecules orient in a predetermined direction by orientation treatment. For example, when rubbing treatment is carried out, minute unevenness is formed on a surface of the oriented film by the rubbing treatment, and thus it becomes easy to orient the liquid crystal molecules along grooves caused by the unevenness. This is because the liquid crystal molecules are affected by the unevenness and orient in a direction that results in minimum elastic free energy (direction parallel to the groove) so that elastic strain energy does not become high.

However, it can be considered that the liquid crystal molecules in the circumference of the foreign matter are not oriented along minute grooves formed by the rubbing treatment but are oriented in various directions. It can be considered that this is because the molecular chains on the surface of the foreign matter do not orient in a fixed direction but orient in various directions, and under the influence of this, the direction that the elastic free energy of the liquid crystal molecules in the circumference of the foreign matter is stable is not a fixed direction determined by the orientation treatment. As a result, the orientation abnormality arises in the circumference of the foreign matter, which makes a difference in light transmittance from a portion without a foreign matter in the liquid crystal panel, and thus a bright spot appears.

In many cases, foreign matters that have remained in the panel are: shavings of oriented film material that has remained on the oriented film as a result of, for example, rubbing treatment; or organic substances, such as protein coming from human bodies. Accordingly, there is a high probability of occurrence of a bright spot that results from orientation abnormality of the liquid crystal in the circumference of the foreign matter. In addition, even if the size of a foreign matter is so minute as to be invisible, the size of a bright spot becomes larger than the size of a foreign matter so as to be visible when orientation abnormality arises in the liquid crystal in the circumference of the foreign matter. Accordingly, it is especially important to modify a bright spot that results from orientation abnormality of the liquid crystal in the circumference of the foreign matter.

With respect to the method of modifying a bright spot of a liquid crystal panel, Japanese Unexamined Patent Application Publication (JP-A) No. 2007-065653 discloses a method of manufacturing a liquid crystal display. The liquid crystal display includes a pair of substrates arranged to face each other, and a liquid crystal layer formed between the substrates. The method includes: forming a microhole on a back surface of one of the substrates correspondingly to a portion where a bright spot produced as a result of a foreign matter remaining between the substrates is produced; forming a light blocking substance layer which blocks the bright spot according to light intensity of the bright spot inside the microhole; and irradiating the light blocking substance with ultraviolet rays in order to cure the light blocking substance. According to the method of manufacturing a liquid crystal panel, a light blocking substance layer corresponding to light intensity of the bright spot is formed. Accordingly, the modified portion is not observed in black exceptionally even if the screen is a gray screen, and thus it is possible to improve visual appreciation.

Moreover, JP-A No. 2007-171905 discloses a method of modifying a flat display panel including a first substrate and a second substrate, and at least one foreign matter arranged above either one of the first substrate and the second substrate. The method includes: forming a hole corresponding to the foreign matter on the first substrate or the second substrate; filling the hole with resin; and irradiating the resin with polarized ultraviolet rays. According to such a method of modifying a bright spot, a bright spot produced in the display panel is eliminated. Regarding ultraviolet rays to be used for irradiating the resin, a polarization component parallel to the orientation direction of the oriented film can damage bonds among the molecules of the oriented film. Therefore, damage in the oriented film can be minimized by irradiating the resin with ultraviolet rays of polarization components that are not parallel to the orientation direction of the oriented film and by blocking the polarization component parallel to the orientation direction.

Further, JP-A No. 2000-89231 discloses a method of manufacturing an optical device in which irregularity is modified by irradiating a portion where irregularity based on orientation treatment is produced with ultraviolet rays after forming an oriented film on one side of at least one substrate member of two substrate members at least one of which has translucency, or after enclosing liquid crystal between two substrate members including oriented films and completing the optical device. According to such a method of manufacturing an optical device, display quality improves since irregularity in the oriented film in the optical device is modified by irradiating the portion where irregularity in the oriented film is produced with ultraviolet rays.

The methods described in JP-A Nos. 2007-065653 and 2007-171905 are further described with reference to FIG. 7 and FIGS. 8A and 8B. FIG. 7 is a schematic diagram illustrating a situation that an observer views a liquid crystal panel from the front and a situation that an observer views a liquid crystal panel obliquely (at an angle). The illustrated liquid crystal panel includes a first transparent substrate 11, a second transparent substrate 12, a liquid crystal layer 13 and oriented films 15. FIG. 8A is a schematic diagram illustrating a case where a liquid crystal panel in which a bright spot has been modified by a conventional technique displays a black screen. FIG. 8B is a schematic diagram illustrating a case where a liquid crystal panel in which a bright spot has been modified by a conventional technique displays a white screen. FIGS. 8A and 8B illustrate pixels 51, a black matrix 52 and a light blocking substance layer formation portion 53 in the liquid crystal panel.

Both of the methods described in JP-A Nos. 2007-065653 and 2007-171905 merely shield the bright spot with light blocking substance 25 arranged in a hole 31 and do not modify liquid crystal orientation in the circumference of the foreign matter (see liquid crystal molecules 14 in FIG. 7). Accordingly, as illustrated in FIG. 7, when an observer views the liquid crystal panel around the foreign matter 17 from the front, the observer does not see a bright spot since backlight light 42 is blocked, but when viewing the liquid crystal panel from an oblique direction, the observer sees a bright spot caused by orientation abnormality of liquid crystal in the circumference of the foreign matter 17 because of backlight light 42 that entered the liquid crystal from an oblique direction. In order to block the backlight light 42 that enters the liquid crystal from an oblique direction, it is necessary to form a light blocking substance layer of an area considerably larger than that of the bright spot. In addition, since the bright spot is always shielded with the light blocking substance 25, the blocked part always has a fixed tone irrespective of the tone that should be displayed. Accordingly, as illustrated in FIG. 8A, the blocked part (light blocking substance layer formation portion 53) is not highly distinguishable when the liquid crystal display displays a black or gray screen. However, as illustrated in FIG. 8B, the blocked part can be seen as a dark spot when the liquid crystal display displays a white screen.

In addition, in the method disclosed in JP-A No. 2000-89231, in a case that the optical device is irradiated with ultraviolet rays after the oriented film is formed, a bright spot cannot be modified if a foreign matter or the like enters into the optical device after irradiation of the optical device with ultraviolet rays and before assembling the optical device, and a bright spot and irregularity resulting from, for example, dusts, stuck onto the substrate surface after the irradiation cannot be modified. In another case that the optical device is irradiated with ultraviolet rays after the optical device is assembled, irradiation with ultraviolet rays is carried out via the substrate member. Therefore, the substrate member absorbs ultraviolet rays of wavelength required for modifying the irregularity (or bright spot), and thus the irregularity (or bright spot) cannot be modified by UV irradiation. Further, it is necessary to prepare a mask dedicated for the size and the shape of the irregularity (or bright spot), and thus it is costly. In addition, JP-A No. 2000-89231 does not explicitly indicate a method of modifying a bright spot produced as a result of a foreign matter.

The present invention seeks to solve the problems.

SUMMARY

In view of the above-described issues, there are provided illustrative liquid crystal panels that can improve image quality thereof by reducing a visual recognition level of the bright spot that appears because of a foreign matter that has remained in the liquid crystal panel, and methods of manufacturing the liquid crystal panel.

A liquid crystal panel illustrating one aspect of the present invention is a liquid crystal panel comprising: a first transparent substrate; a second transparent substrate; and a liquid crystal layer formed between the first transparent substrate and the second transparent substrate. The first transparent substrate and the second transparent substrate have transparency in a visible light region and an ultraviolet absorptive property. At least one of the first transparent substrate and the second transparent substrate includes a structure arranged in a predetermined region thereof, where the structure transmits ultraviolet rays in a specific wavelength range.

A method of manufacturing a liquid crystal panel illustrating one aspect of the present invention is a method of manufacturing a liquid crystal panel, comprising: forming a liquid crystal layer between a first transparent substrate and a second transparent substrate, where the first transparent substrate and the second transparent substrate have transparency in a visible light region and an ultraviolet absorptive property. The method further comprises forming a structure that transmits ultraviolet rays in a specific wavelength range in a predetermined region on at least one of the first transparent substrate and the second transparent substrate; and irradiating a portion of the liquid crystal layer corresponding to the predetermined region with the ultraviolet rays in the specific wavelength range.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIG. 1A is a schematic diagram illustrating a region where ultraviolet rays in the specific wavelength range pass through, FIG. 1B is a schematic diagram illustrating a method of irradiating a bright spot portion with ultraviolet rays in the specific wavelength range, FIG. 1C is a schematic diagram illustrating a method of filling a region where ultraviolet rays in the specific wavelength range pass through with adhesive material for a polarization plate, and FIG. 1D is a flowchart illustrating a method of manufacturing a liquid crystal panel;

FIG. 4A is a schematic diagram illustrating a method of filling a region that transmits ultraviolet rays in the specific wavelength range with substance that is transparent to light in the visible light region and has a refractive index different from that of the first transparent substrate or the second transparent substrate in the visible light region, and FIG. 4B is a schematic view illustrating the liquid crystal panel after a polarization plates are adhered;

FIG. 5A is a schematic diagram illustrating a region where ultraviolet rays in the specific wavelength range pass through, FIG. 5B is a schematic diagram illustrating a method of irradiating the bright spot portion with ultraviolet rays in the specific wavelength range, and FIG. 5C is a schematic diagram illustrating a method of filling a region where ultraviolet rays in the specific wavelength range pass through with adhesive material of the polarization plate;

FIG. 6A is a schematic diagram illustrating a region where ultraviolet rays in the specific wavelength range pass through, FIG. 6B is a schematic diagram illustrating a method of irradiating the bright spot portion with ultraviolet rays in the specific wavelength range, FIG. 6C is a schematic diagram illustrating a method of irradiating the bright spot portion with ultraviolet rays in the specific wavelength range, and FIG. 6D is a schematic diagram illustrating a method of filling a region where transmits ultraviolet rays in the specific wavelength range with adhesive material for the polarization plate;

FIG. 8A is a schematic diagram of a case where a panel in which a bright spot has been modified by a conventional technique displays a black screen, and FIG. 8B depicts a schematic diagram of a case where a panel in which a bright spot has been modified by a conventional technique displays a white screen.

DETAILED DESCRIPTION

Figure 1A:
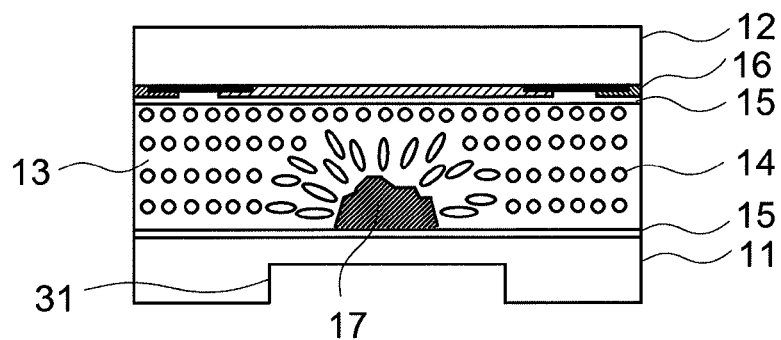
FIGS. 1A to 1D are diagrams for illustrating a liquid crystal panel according to Example 1, where

Illustrative embodiments of liquid crystal panels and manufacturing methods of the liquid crystal panel will be described below with reference to the drawings. It will be appreciated by those of ordinary skill in the art that the description given herein with respect to those figures is for exemplary purposes only and is not intended in any way to limit the scope of potential embodiments which may be resolved by referring to the appended claims.

According to the illustrative liquid crystal panels and the illustrative methods of manufacturing the liquid crystal panel as embodiments of the present invention, a structure that transmits ultraviolet rays in a specific wavelength range is formed in a predetermined region of at least one transparent substrate that has transparency in the visible light region and an ultraviolet absorptive property. Thereby, the transparent substrate acts as a mask, and only the predetermined region transmits ultraviolet rays in the specific wavelength region. Accordingly, molecular chains that cause orientation abnormality and are on the surface of the foreign matter can be irradiated with ultraviolet rays without damaging the oriented film of a normal portion where there are no foreign matters remaining (that is, the part other than the predetermined region) by ultraviolet rays.

For example, if the wavelength of ultraviolet rays to be used for the irradiation are set in a wavelength range in which the ultraviolet rays have energy higher than the chemical bond energy of the molecular chains that cause orientation abnormality and are on the surface of the foreign matter, the molecular chains that cause such orientation abnormality can be cut.

If the molecular chains that cause orientation abnormality is cut, the liquid crystal molecules that orient by interacting with the molecular chains on the surface of the foreign matter are not affected by the molecular chains on the surface of the foreign matter, and thus orient in a direction to which the liquid crystal material in a region without a foreign matter orients. This is because the influence of the molecular chains on the surface of the foreign matter is eliminated, and elastic free energy becomes more stable when the liquid crystal molecules orient in a direction to which the liquid crystal material in a region without a foreign matter orients.

As a result, the orientation abnormality of the liquid crystal molecules in the circumference of the foreign matter can be modified and the difference of liquid crystal molecules in light transmittance from those in the circumference of the foreign matter becomes small, and thus the visual recognition level of the bright spot can be lowered and image quality can be improved.

In addition, by modifying liquid crystal orientation in the circumference of the foreign matter instead of blocking the bright spot, the visual recognition level of the bright spot can be lowered and image quality can be improved when an observer views the liquid crystal panel at any angle.

In addition, by forming the structure that transmits ultraviolet rays in the specific wavelength range in the predetermined region and filling the structure with a substance which is transparent to light in the visible light region, formation traces of the substance are not seen as a dark spot when a white screen is displayed.

In addition, since ultraviolet rays in the specific wavelength range pass through only the predetermined region, there is no need to cover the normal portion where there is no remaining foreign matter with a mask. Accordingly, it is not necessary to prepare a mask dedicated for the shape and size of the bright spot, and thus the visual recognition level of the bright spot can be lowered and image quality can be improved with low manufacturing cost.

Further, it is preferable that the above-described liquid crystal panel is a liquid crystal panel that works in an IPS mode.

According to the illustrative liquid crystal panels and the illustrative methods of manufacturing the liquid crystal panel as embodiments of the present invention, the visual recognition level of a bright spot that appears as a result of a foreign matter that has remained in the liquid crystal panel can be lowered and image quality can be improved with low manufacturing cost.

A liquid crystal panel according to one of the embodiments will be described with reference to FIGS. 1A to 1D. The liquid crystal panel includes: a first transparent substrate 11; a second transparent substrate 12; and a liquid crystal layer 13 formed between the first transparent substrate 11 and the second transparent substrate 12. The first transparent substrate 11 and the second transparent substrate 12 have characteristics of being transparent in the visible light region and having an ultraviolet absorption. At least one of the first transparent substrate 11 and the second transparent substrate 12 has a structure formed in a predetermined region thereof, where the structure transmits ultraviolet rays 41 in a specific wavelength range.

Each of the first transparent substrate 11 and the second transparent substrate 12 has, for example, dependency of light transmittance on wavelength, and is made of a transparent material that changes light transmittance for a predetermined wavelength range corresponding to the thickness. In addition, the structure that transmits ultraviolet rays 41 in the specific wavelength range is, for example, a recess (hereafter referred to as "hole 31") formed on at least one of the first transparent substrate 11 and the second transparent substrate 12.

The glass material has characteristics that exhibit higher transmittance for ultraviolet rays 41 having short wavelength as the thickness is thinner. Accordingly, if a hole 31 having a predetermined depth is formed on the first transparent substrate 11 and/or the second transparent substrate 12 made of glass material such that the glass plate thickness of the portion where the hole 31 is formed in the corresponding transparent substrate is made thin, the portion transmits ultraviolet rays 41 of shorter wavelength.

The hole 31 is formed on a surface of the first transparent substrate 11 and/or the second transparent substrate 12, where the surface is opposite to the surface on which the liquid crystal layer 13 is formed. A part of the liquid crystal layer 13 corresponding to the portion of the transparent substrate where a structure that transmits ultraviolet rays 41 of the specific wavelength range is formed, for example, the portion where the hole 31 is formed as described above, is controlled its orientation by irradiating with ultraviolet rays 41 in the specific wavelength range.

Hereafter, operations of the liquid crystal panel according to the present embodiment will be described.

Figure 9:
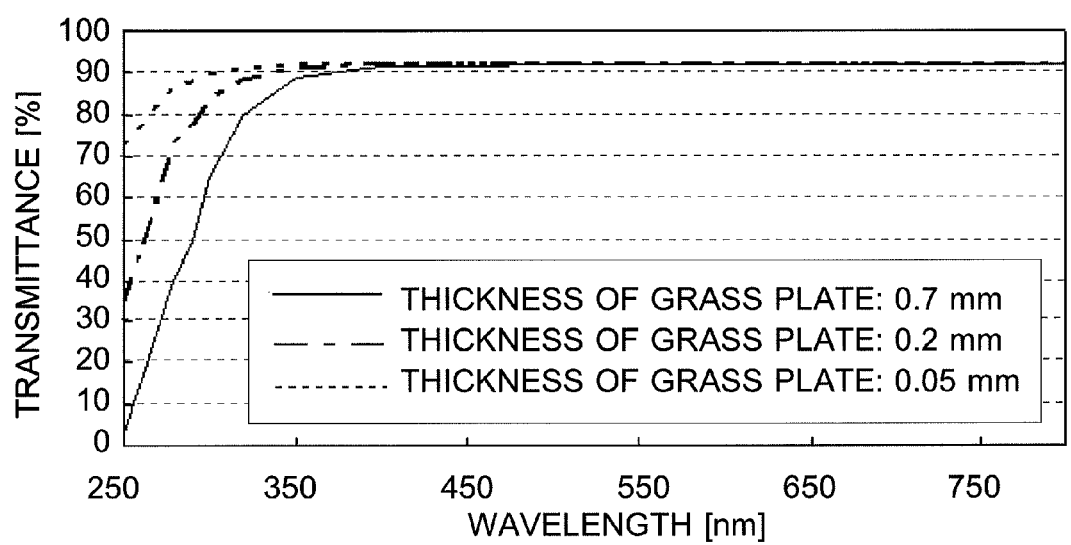
FIG. 9 is a diagram illustrating wavelength dependency and plate thickness dependency of the light transmittance of glass.

The first transparent substrate 11 and the second transparent substrate 12 are constituted by substrates formed by transparent materials, such as glass. As illustrated in FIG. 9, light transmittance of the first transparent substrate 11 and the second transparent substrate 12 formed by glass in the ultraviolet region to the visible light region are such that the transmittance is high in the visible light region, the transmittance falls rapidly as the wavelength becomes shorter, and the light absorption rates are high in the ultraviolet region having shorter wavelength. That is, the first transparent substrate 11 and the second transparent substrate 12 have characteristics of having transparency in the visible light region and an absorptive property in the ultraviolet region. In addition, as illustrated in FIG. 9, glass material has characteristics that exhibit higher transmittance for ultraviolet rays having short wavelength as the thickness is thinner. For example, the transmittance for ultraviolet rays of wavelength 250 nm is about 0% for glass plate thickness of 0.7 mm, whereas the transmittance is about 80% for glass plate thickness of 0.05 mm.

Accordingly, by forming the hole 31 of the predetermined depth in the first transparent substrate 11 and/or the second transparent substrate 12 each formed of glass, the glass plate thickness of the portion where the hole 31 is formed becomes thinner than that of a portion where the hole 31 is not formed, and thus the portion where the hole 31 is formed transmits ultraviolet rays 41 having shorter wavelength. In addition, it is possible to adjust thickness of the glass plate of the portion of the hole 31 by adjusting the depth of the hole 31 (or the thickness of the corresponding transparent substrate), and therefore it is possible to adjust the wavelength of ultraviolet rays 41 to be transmitted and the transmittance.

Thus, by irradiating the first transparent substrate 11 and/or the second transparent substrate 12 with ultraviolet rays 41 in the specific wavelength range after forming the hole 31 that transmits ultraviolet rays 41 in the specific wavelength range in a predetermined region of the first transparent substrate 11 and/or the second transparent substrate 12, the transparent substrate including the hole serves as a mask so that irradiation with ultraviolet rays 41 in the specific wavelength range is carried out only on the part of the liquid crystal layer 13 corresponding to the portion of the transparent substrate where the hole 31 is formed. For example, a hole 31 that transmits ultraviolet rays 41 of the specific wavelength range is formed in a region on the first transparent substrate 11 and/or the second transparent substrate 12, where the region corresponds to a location where a bright spot is caused by the foreign matter 17 that has remained on the corresponding transparent substrate. Such structure allows molecular chains 18 that cause orientation abnormality and are on the surface of the foreign matter 17 to be irradiated with ultraviolet rays 41 in the specific wavelength range.

Here, it can be considered that chemical bonds, such as C—H and O—H, are included in the molecular chain 18 that causes orientation abnormality on the surface of the foreign matter 17, and the bond energy of the chemical bond is about 98 kcal/mol in the case of C—H, and about 109 kcal/mol in the case of O—H.

Meanwhile, energy E that the electromagnetic wave has is expressed as:

$$E = \frac{1}{4.2} \cdot N \cdot h \cdot \frac{c}{\lambda} \quad \text{(kcal/mol)}, \tag{1}$$

where h is Planck's constant, c is velocity of light, λ is wavelength, and N is Avogadro constant.

For example, the energy of electromagnetic wave having wavelength of 250 nm is calculated from Expression (1) as about 117 kcal/mol. Accordingly, the energy of ultraviolet rays 41 having wavelength of 250 nm is higher than chemical bond energy of, for example, C—H and O—H, included in the molecular chain 18 on the surface of the foreign matter 17, and therefore such ultraviolet rays can cut the bonding. In addition, Expression (1) indicates that the energy of electromagnetic wave is higher as the wavelength λ, become shorter. Accordingly, when the surface of the foreign matter 17 is irradiated with ultraviolet rays 41 having shorter wavelength, it is possible to cut the bonding of the molecular chains 18 on the surface of the foreign matter 17 having larger bond energy.

Accordingly, it is possible to cut bonding of the molecular chains 18 that cause orientation abnormality on the surface of the foreign matter 17 by the following processes: forming a hole 31 that transmits ultraviolet rays 41 of the above-described wavelength, in a portion (referred to as a hole 31 portion) of the first transparent substrate 11 and/or the second transparent substrate 12, the portion corresponding to the location where a bright spot is caused by the foreign matter 17 that has remained on the corresponding transparent substrate; and irradiating the hole 31 portion with ultraviolet rays 41 of the above-described wavelength.

Usually, liquid crystal molecules 14 are oriented in a predetermined direction by orientation treatment. For example, when rubbing treatment is carried out, minute unevenness is formed by the rubbing treatment on the surface of the oriented film 15, and thus the liquid crystal molecules 14 tend to orient along the groove formed by the unevenness. This is because the liquid crystal molecules 14 are affected by the unevenness and orient in a direction where elastic free energy is minimum (direction parallel to the groove) such that elastic strain energy does not become high.

However, it can be considered that the liquid crystal molecules 14 in the circumference of the foreign matter 17 do not orient along the minute groove formed by the rubbing treatment but orient in various directions. It can be considered that this is because the molecular chains 18 on the surface of the foreign matter 17 orient not in a certain direction but in various directions, and under the influence of this, the direction that the elastic free energy of the liquid crystal molecules 14 in the circumference of the foreign matter 17 becomes stable is a direction not a certain direction defined by the orientation treatment. As a result, orientation abnormality arise in the circumference of the foreign matter 17 and a difference arises in the transmittance of light in a region in the circumference of the foreign matter 17 also, and thus there is produced a defect larger than the size of the foreign matter 17.

By irradiating a hole 31 formed in a portion corresponding to the foreign matter 17 that has remained in the transparent substrate with ultraviolet rays 41 in the specific wavelength range, the molecular chains 18 on the surface of the foreign matter 17 are cut, thereby the liquid crystal molecules 14 that orient by interacting with the molecular chain 18 on the surface of the foreign matter 17 become not affected by the molecular chain 18 on the surface of the foreign matter 17, and thus orient in the direction at which the liquid crystal material in a region without a foreign matter 17 orients. This is because elastic free energy becomes more stable when the liquid crystal molecules 14 orient in a direction at which the liquid crystal material in a region without a foreign matter 17 orients as a result of the influence of the molecular chain 18 on the surface of the foreign matter 17 being eliminated.

As a result, since the liquid crystal molecules 14 in the circumference of the foreign matter 17 are oriented in the same direction as the liquid crystal molecules 14 of the portion without a foreign matter 17, it is possible to modify orientation abnormality of the liquid crystal molecules 14 in the circumference of the foreign matter 17. By modifying the orientation abnormality of the liquid crystal molecules 14 in the circumference of the foreign matter 17, the difference in light transmittance of liquid crystal molecules in the circumference of the foreign matter 17 becomes small, and thus it is possible to lower the visual recognition level of the bright spot and improve image quality.

In addition, since the ultraviolet rays 41 in the specific wavelength range passes through only the portion where a structure transmitting ultraviolet rays 41 in the specific wavelength range is formed, there is no need to cover with a mask a normal portion where no foreign matter 17 remains. Accordingly, there is no need to prepare a mask dedicated for the shape and size of the bright spot. Thus, it is possible to lower the visual recognition level of the bright spot with low manufacturing cost and improve the image quality.

EXAMPLE

Example 1

Figure 1B:
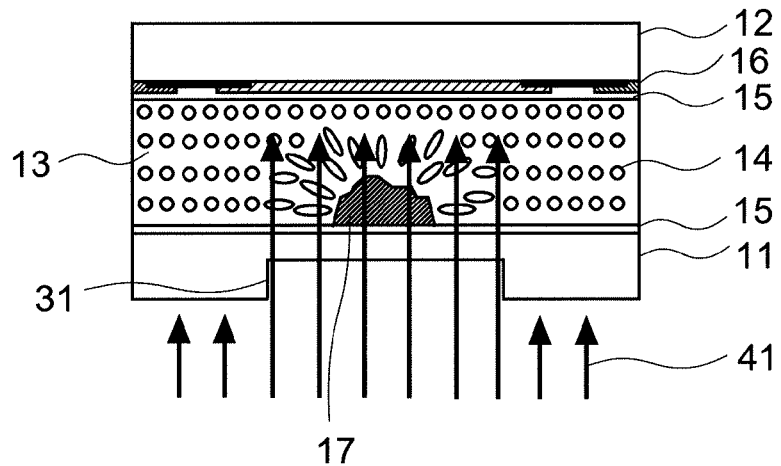
Figure 1C:
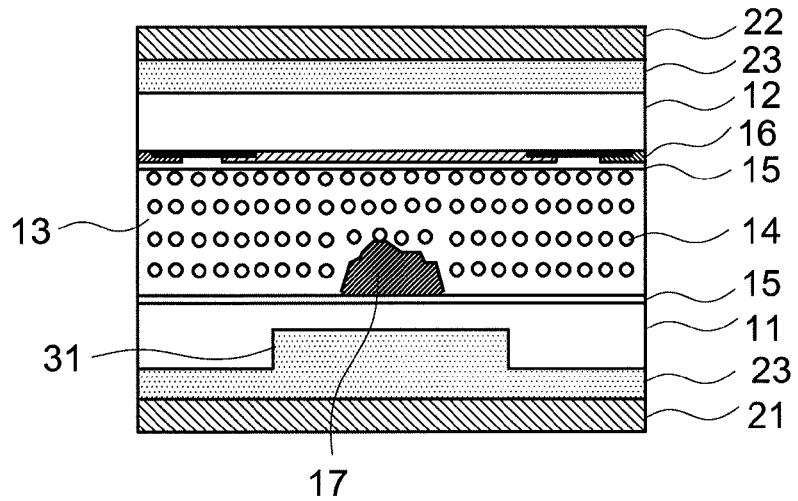
Figure 1D:
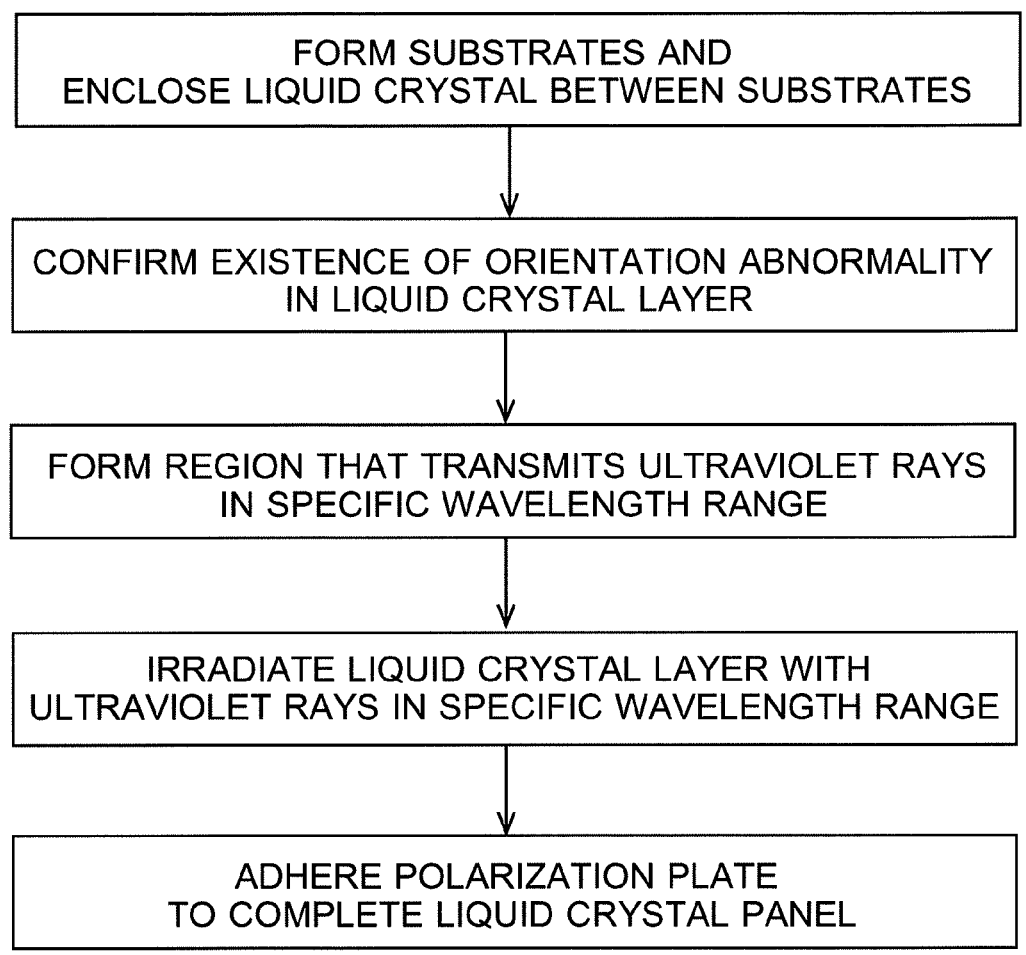

In order to describe the above embodiments of the present invention further, a liquid crystal panel and a method of manufacturing the liquid crystal panel according to Example 1 will be described with reference to FIGS. 1A to 1D. FIG. 1A is a schematic diagram illustrating a region where ultraviolet rays in the specific wavelength range pass through. FIG. 1B is a schematic diagram illustrating a method of irradiating the bright spot portion with ultraviolet rays in the specific wavelength range. FIG. 1C is a schematic diagram illustrating a method of filling a region where ultraviolet rays in the specific wavelength range passes through with adhesive material for the polarization plate. FIG. 1D is a flowchart for illustrating a method of manufacturing a liquid crystal panel according to the present example.

As illustrated in FIGS. 1A to 1D, the liquid crystal panel according to the present example is constituted by: a first transparent substrate 11 and a second transparent substrate 12 that are formed by transparent material and face each other; and a liquid crystal layer 13 enclosed between the first transparent substrate 11 and the second transparent substrate 12.

The first transparent substrate 11 and the second transparent substrate 12 have characteristics of having transparency in the visible light region and an ultraviolet absorption property. Each of the first transparent substrate 11 and the second transparent substrate 12 is a substrate formed by a glass material, for example. As described above, the glass material has characteristics of having high transparency in the visible light region, rapidly lowering the transmittance as the wavelength becomes shorter, and having high light absorption rate in the ultraviolet region having short wavelength. That is, the glass material has characteristics of having transparency in the visible light region and an absorptive property in the ultraviolet region.

Although not illustrated in the drawings, thin film transistors are formed on the first transparent substrate 11. A plurality of electrodes formed by transparent electrically-conductive material, such as ITO (Indium Tin Oxide), are formed thereon. Further a thin film formed of an oriented film material is applied on the electrodes, and is subjected to orientation treatment, to form an oriented film 15 that orients the liquid crystal molecules 14 to a certain direction.

In addition, a color filter layer 16 is formed on the second transparent substrate 12 as necessary. The color filter layer 16 is formed by arranging pixels containing pigments of different colors, such as red, green and blue. A black matrix having light blocking characteristics partitions adjacent pixels with each other. Further, a thin film formed of an oriented film material, such as polyimide, is applied thereon and orientation treatment is carried out, and thus an oriented film 15 that orients the liquid crystal molecules 14 in a certain direction is formed.

Examples of the orientation treatment include rubbing treatment and photo-alignment treatment. Rubbing treatment is treatment in which the above-described thin film is rubbed in a predetermined orientation direction with a rubbing roller around which rubbing cloth, which is a friction member, is wound. The thin film that has undergone the rubbing treatment has an orientation regulating capability that makes the liquid crystal molecules 14 orient in a certain direction. Optical orientation treatment is treatment that gives orientation regulating capability by irradiating the above-described thin film with ultraviolet rays 41, and thus chemical bonds in macromolecules in the oriented film material are decomposed, isomerized and dimerized.

After applying orientation treatment to both substrates, the liquid crystal layer 13 is formed between the substrates. The liquid crystal material contains liquid crystal molecules 14 having positive dielectric anisotropy, for example. The liquid crystal molecules 14 are oriented such that their longitudinal axis directions are the same as the orientation directions of the molecular chains of the oriented film 15.

Examples of the method of forming the liquid crystal layer 13 include a method that forms the liquid crystal layer 13 by: applying a sealant in a rectangular frame shape a part of which is opened; adhering the substrates together; and injecting liquid crystal material from the opened part. Alternatively, there is a method that forms the liquid crystal layer 13 by: applying a sealant in a rectangular frame shape on one of the substrates; dropping liquid crystal in a region surrounded by the sealant; and thereafter adhering the substrates together.

Here, a foreign matter 17 may remain on the first transparent substrate 11 and/or the second transparent substrate 12. Examples of the foreign matter 17 include shavings of the oriented film material shaved at the time of the rubbing treatment. When a foreign matter 17 of such an organic substance remains on the first transparent substrate 11 and/or the second transparent substrate 12, the liquid crystal molecules 14 in the circumference of the foreign matter 17 are affected by the molecular chains 18 on the surface of the foreign matter 17 even if the foreign matter 17 itself is minute such that it is not visible, and thus the orientation becomes abnormal. As a result, the light transmittance in the circumference of the foreign matter 17 becomes higher than that of other portions, and thus the foreign matter 17 may show a bright spot that is large enough to be visible.

Such a bright spot caused by the foreign matter 17 can be detected by a defect inspection of the liquid crystal panel. In the defect inspection of the liquid crystal panel, a location where the bright spot occurs, and size and shape of the bright spot are identified (confirmed) by, for example: operating the pixels to conduct display a screen such that all pixels have the same tone; and detecting a pixel that has luminance different from other pixels. In particular, the existence of the bright spot, the location where the bright spot occurred, size and shape of the bright spot are identified by sandwiching the liquid crystal panel between a pair of polarization plates arranged in parallel and placing the liquid crystal panel before a predetermined light source. At this time, each of the polarization plates is arranged so that their transmission axes intersect perpendicularly with each other. Though the polarization plates are attached onto the outer side of the first transparent substrate 11 and the second transparent substrate 12 (that is, onto the light-incident surface and the light-outgoing surface of the liquid crystal panel), it is not necessary to adhere the polarization plates onto the outer side of these transparent substrates. Moreover, at this time, voltage may be or may not be applied to the liquid crystal panel. For example, a black screen is displayed in a state where no voltage is applied in the case of a liquid crystal panel having normally black mode, and thus a bright spot defective part can be detected even if voltage is not applied.

When a bright spot caused by the foreign matter 17 is detected by the above defect inspection, the visual recognition level of the bright spot is lowered by: forming a region where ultraviolet rays 41 in the specific wavelength range pass through in a portion of the first transparent substrate 11 and/or the second transparent substrate 12 corresponding to the bright spot coming from the foreign matter 17; and irradiating the portion with ultraviolet rays 41, and thus the image quality improves. As illustrated in FIG. 1A, in the liquid crystal panel according to the present example, a hole 31 is formed in the region that transmits ultraviolet rays 41 in the specific wavelength range by excavating the first transparent substrate 11, for example, correspondingly with the size of the bright spot caused by the foreign matter 17 that has remained in the first transparent substrate 11.

As described above, the glass material has characteristics that exhibit higher transmittance for ultraviolet rays 41 having short wavelength as the thickness is thinner. Accordingly, ultraviolet rays 41 having shorter wavelength can be transmitted by forming a hole 31 having a predetermined depth on the first transparent substrate 11 made of glass material and making glass plate thickness of the portion where the hole 31 is formed thin.

That is, the thickness of the transparent substrate at portions excluding the hole 31 is set such that ultraviolet rays 41 having wavelength less than or equal to 250 nm do not pass through; and as for the thickness of the transparent substrate at the hole 31 portion, the depth of the hole 31 is set such that ultraviolet rays 41 having wavelength less than or equal to 250 nm pass through the hole 31 portion. As described above, energy of ultraviolet rays 41 having wavelength of 250 nm is higher than chemical bond energy of, for example, C—H and O—H, included in the molecular chains 18 on the surface of the foreign matter 17 causing orientation abnormality. Therefore, such ultraviolet rays can cut the bonding of the molecular chains.

Specifically, the hole 31 portion that transmits ultraviolet rays 41 less than or equal to 250 nm is formed such that glass plate thickness of the hole 31 portion after the hole 31 is formed is set to less than or equal to 0.2 mm, for example. For the above-described glass material having the plate thickness of 0.05 mm and the transmittance for ultraviolet rays 41 of wavelength 250 nm being 80%, when the thickness of the glass material is increased to 0.2 mm, which is four times thicker, the glass material transmits about 40% of ultraviolet rays 41 of 250 nm of $(100 \times 0.8^{(0.2/0.05)}$=about 40%) with respect to the incident ultraviolet rays 41.

Such a hole 31 is formed at an opposite surface of the first transparent substrate 11 to the surface on which the liquid crystal layer 13 is formed, by using, for example, a UV laser. The size and the shape of the hole 31 can be formed so as to correspond with the size and the shape of the bright spot by adjusting the spot diameter and the spot shape of the above-described UV laser using, for example, a slit. In addition, the depth of the hole 31 can be adjusted based on the irradiation intensity and the irradiation time period of the UV laser.

In addition, the hole 31 is formed such that the side surface of the hole 31 extending in the depth direction extends in the same direction as an axial direction (normal direction) of the substrate surface. In so doing, angle adjustment of the light irradiation axis and the substrate surface becomes simple when excavating the first transparent substrate 11 using, for example, a UV laser. Therefore, it is possible to shorten the treatment time period for forming the hole 31 and improve production efficiency.

Thus, the portion of the liquid crystal molecules 14 around the hole 31 formed in this way are irradiated with non-polarized ultraviolet rays 41 and bonding of the molecular chains 18 on the surface of the foreign matter 17 that causes orientation abnormality is cut, and thereby the orientation of the liquid crystal molecules 14 is controlled.

In order to cut the bonding of the molecular chains 18 on the surface of the foreign matter 17 that causes orientation abnormality, it is necessary to make the light absorption axis of the molecular chain 18 on the surface of the foreign matter 17 the same as the polarization direction of the irradiating ultraviolet rays 41. However, it can be considered that the molecular chains 18 on the surface of the foreign matter 17 orient in various directions rather than in a certain direction. Accordingly, by irradiating with non-polarized ultraviolet rays 41, it is possible to cut the bonding of the molecular chains 18 on the surface of the foreign matter 17 orienting in various directions can be cut by one UV irradiation. It should be noted that, for example, a laser, a light emitting diode, and a mercury lamp can be used for the light source of the ultraviolet rays 41.

As illustrated in FIG. 1B, in the present example, upon irradiating with ultraviolet rays 41, an entire surface of the first transparent substrate 11 is irradiated. At this time, only the hole 31 portion formed on the first transparent substrate 11 transmits ultraviolet rays 41 having a short wavelength. Thus, even if an entire surface of the transparent substrate is irradiated with ultraviolet rays 41, only a portion where the hole 31 is formed transmits ultraviolet rays 41. That is, only a part of the liquid crystal layer 13 corresponding to the bright spot portion is irradiated with ultraviolet rays 41. Thus, by irradiating with ultraviolet rays 41 on an entire surface of the transparent substrate in this way, it is possible to shorten the working hours, and thus productive efficiency is not spoiled greatly even when, for example, there are a plurality of bright spots in the liquid crystal panel. This is because it is not necessary to carry out alignment of the light source of ultraviolet rays 41 and adjustment of the spot diameter.

In addition, the wavelength of irradiating ultraviolet rays 41 is less than or equal to 250 nm, for example. As described above, energy of ultraviolet rays 41 having wavelength of 250 nm is higher than chemical bond energy of, for example, C—H and O—H, included in the molecular chains 18 on the surface of the foreign matter 17 that causes orientation abnormality. Thus, it is possible to ease the orientation abnormality on the surface of the foreign matter 17 by cutting the bonding of the molecular chains.

In addition, irradiation with ultraviolet rays 41 is carried out by adjusting the angle of the light source (the optical axis of irradiated ultraviolet rays) or the angle of the transparent substrate such that the light incident angle (the optical axis of irradiated ultraviolet rays) extends in the same direction as the axial (normal) direction of the substrate surface of the first transparent substrate 11. The side surface of the hole 31 extending in the depth direction is formed so as to extend in the same direction as the axial direction of the substrate surface, and therefore the transmittance for ultraviolet rays 41 is higher when the incident angle is in the same direction as the axial direction of the substrate surface as compared to the case where the incident angle is inclined from the axial direction of the substrate surface. Accordingly, by irradiating with ultraviolet rays 41 such that the axial direction of the substrate surface is in the same direction as the incident angle, it is possible to cut the molecular chains 18 effectively, which cause orientation abnormality on the surface of the foreign matter 17.

Thus, by irradiating a region where a bright spot appears because of a foreign matter 17 with ultraviolet rays 41 in the specific wavelength range, bonding of the molecular chains 18 on the surface of the foreign matter 17 that causes orientation abnormality is cut. Thereby, the liquid crystal molecules 14 in the circumference of the foreign matter 17 are not affected by the molecular chains 18 on the surface of the foreign matter 17 and are affected by the liquid crystal molecules 14 at a portion without a foreign matter 17. Thus, the liquid crystal molecules 14 in the circumference of the foreign matter 17 are controlled to be in the direction to which the liquid crystal molecules 14 at the portion without a foreign matter 17 orient. This is because the influence of the molecular chains 18 on the surface of the foreign matter 17 is eliminated, and thus elastic free energy becomes more stable when the liquid crystal molecules 14 orient in the direction to which the liquid crystal material at a portion without a foreign matter 17 orients.

It should be noted that although FIGS. 1A to 1D illustrate a case where the foreign matter 17 has transparency to ultraviolet rays 41 in the specific wavelength range, the liquid crystal panel according to the present invention is not limited to this and the foreign matter 17 may not have transparency to ultraviolet rays 41 in the specific wavelength range.

The liquid crystal molecules 14 in the circumference of the foreign matter 17 are oriented in substantially the same direction as the orientation direction of the liquid crystal molecules 14 at a portion without a foreign matter 17. Therefore, the orientation direction is not always a fixed orientation direction but changes in substantially the same direction as the portion without a foreign matter 17 according to displaying tone. Accordingly, no matter what level of tone is used for the display, the brightness in the circumference of the foreign matter 17 is substantially the same as that of the portion without a foreign matter 17. As a result, the difference in the light transmittance between the circumference of the foreign matter 17 and the portion without a foreign matter 17 becomes small, thereby lowering the visual recognition level of the bright spot. Thus, it is possible to improve image quality.

In addition, in the liquid crystal panel according to the present example, the tone around the circumference of the foreign matter 17 is not always a fixed tone and is substantially the same tone as the portion without a foreign matter 17. Therefore, the circumference of the foreign matter 17 is not seen as a bright spot when a black screen is displayed, and modification traces are not seen as a dark spot when a white screen is displayed.

In addition, in the liquid crystal panel according to the present example, the orientation directions in the circumference of the foreign matter 17 and in the portion without a foreign matter 17 are substantially the same. Therefore, when the panel is seen from any of the directions, such as up, down, left and right directions, the circumference of the foreign matter 17 has brightness of substantially the same tone as the portion without a foreign matter 17. That is, no bright spots or no dark spots can be seen regardless of parallax.

Further, in the liquid crystal panel according to the present example, ultraviolet rays 41 in the specific wavelength range pass through only the portion where the hole 31 is formed. Therefore, there is no need to cover a normal portion where a foreign matter 17 is not remained with a mask. Accordingly, it is not necessary to prepare a mask dedicated for the shape and size of the bright spot. Thus, it is possible to lower the visual recognition level of the bright spot and improve image quality with low manufacturing cost.

Thereafter, as illustrated in FIG. 1C, by adhering the first polarization plate 21 and the second polarization plate 22 on the outer side of the first transparent substrate 11 and the second transparent substrate 12 (on the light-incident surface and the light-outgoing surface of the liquid crystal panel), that is, on the opposite surfaces to the liquid crystal layer, the hole 31 is filled with the adhesive material 23 used for the first polarization plate 21. For example, when the foreign matter 17 entering into the liquid crystal panel is so small that it cannot be seen or when the transmittance for visible light is low, the liquid crystal panel can be completed easily by adhering the polarization plate and filling the hole 31 with the adhesive material 23 for the polarization plate.

It should be noted that the hole 31 is formed on the first transparent substrate 11 in the above since the foreign matter 17 remains on the first transparent substrate 11. However, when the foreign matter 17 remains on the second transparent substrate 12, the hole 31 may be formed on the second transparent substrate 12. In addition, even if the foreign matter 17 remains on the first transparent substrate 11, the hole 31 may be formed on the second transparent substrate 12. In this case, ultraviolet rays 41 in the specific wavelength range may be irradiated from the outer side of the second transparent substrate 12.

Example 2

Figure 2A:
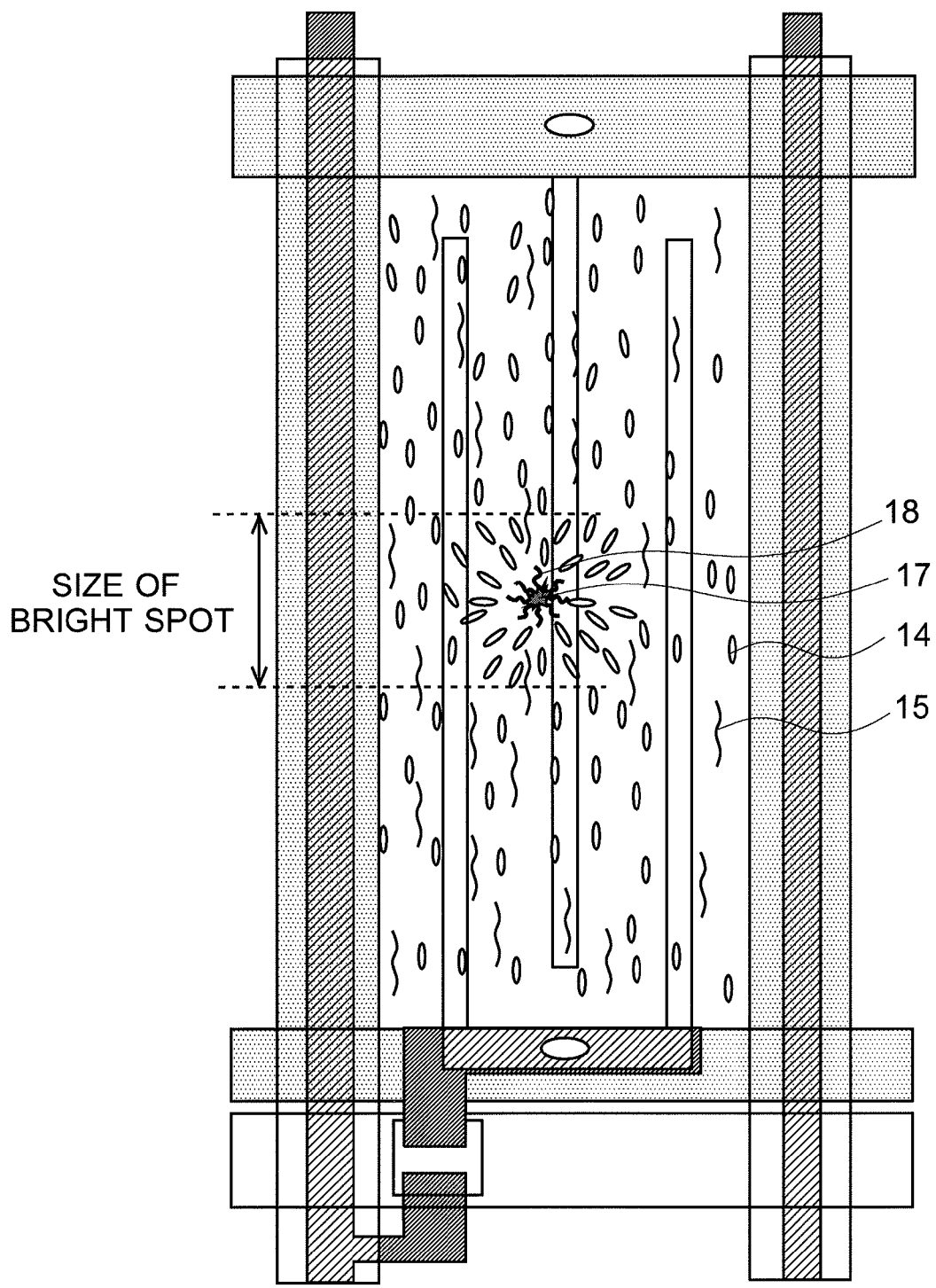
FIG. 2A is a schematic diagram of a liquid crystal panel according to Example 2 for illustrating molecular chains that are on the surface of the foreign matter and cause orientation abnormality and orientation directions of liquid crystal.
Figure 2B:
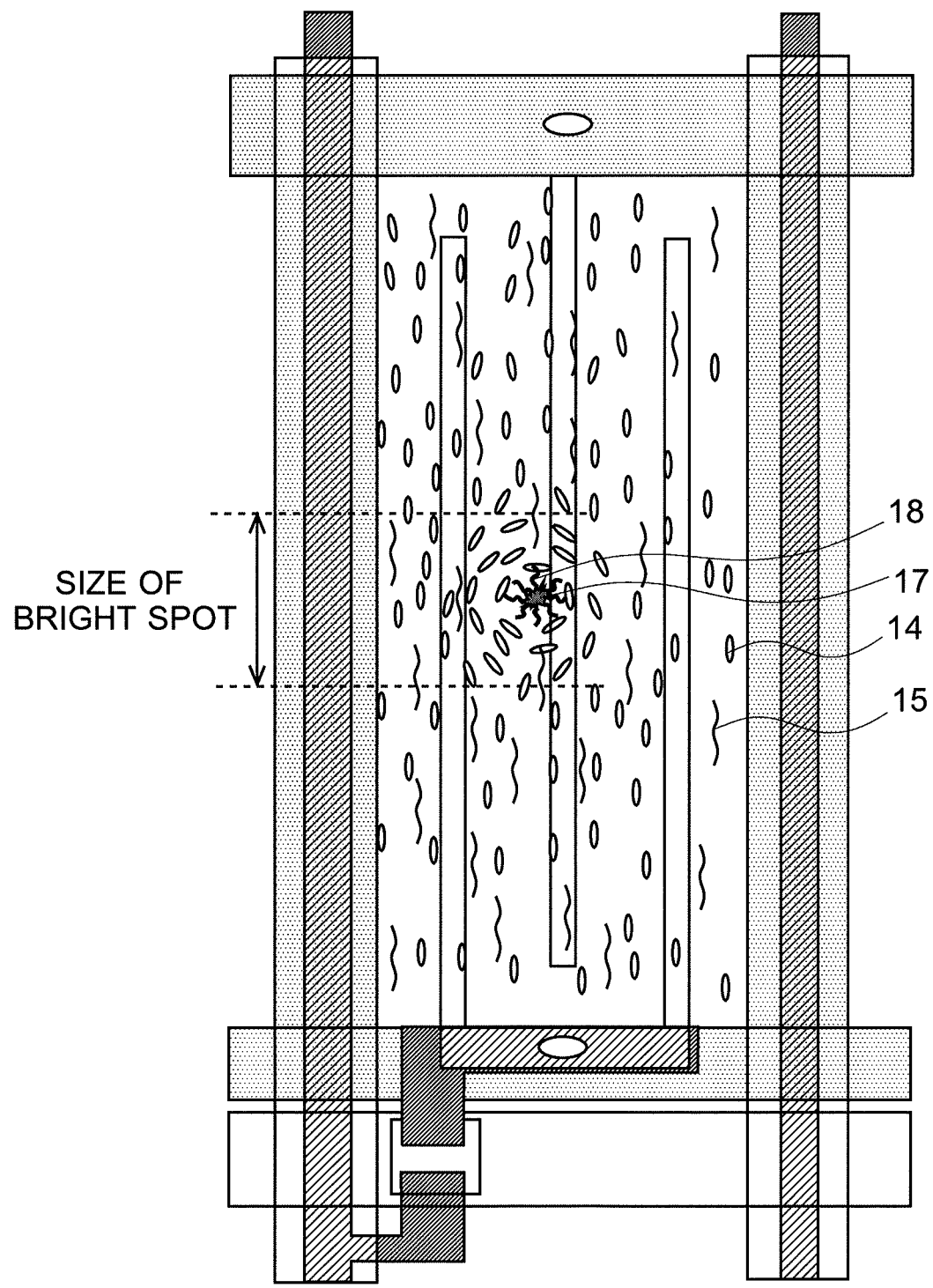
FIG. 2B is a schematic diagram of a liquid crystal panel according to Example 2 for illustrating molecular chains that are on the surface of the foreign matter and cause orientation abnormality and orientation directions of liquid crystal.
Figure 2C:
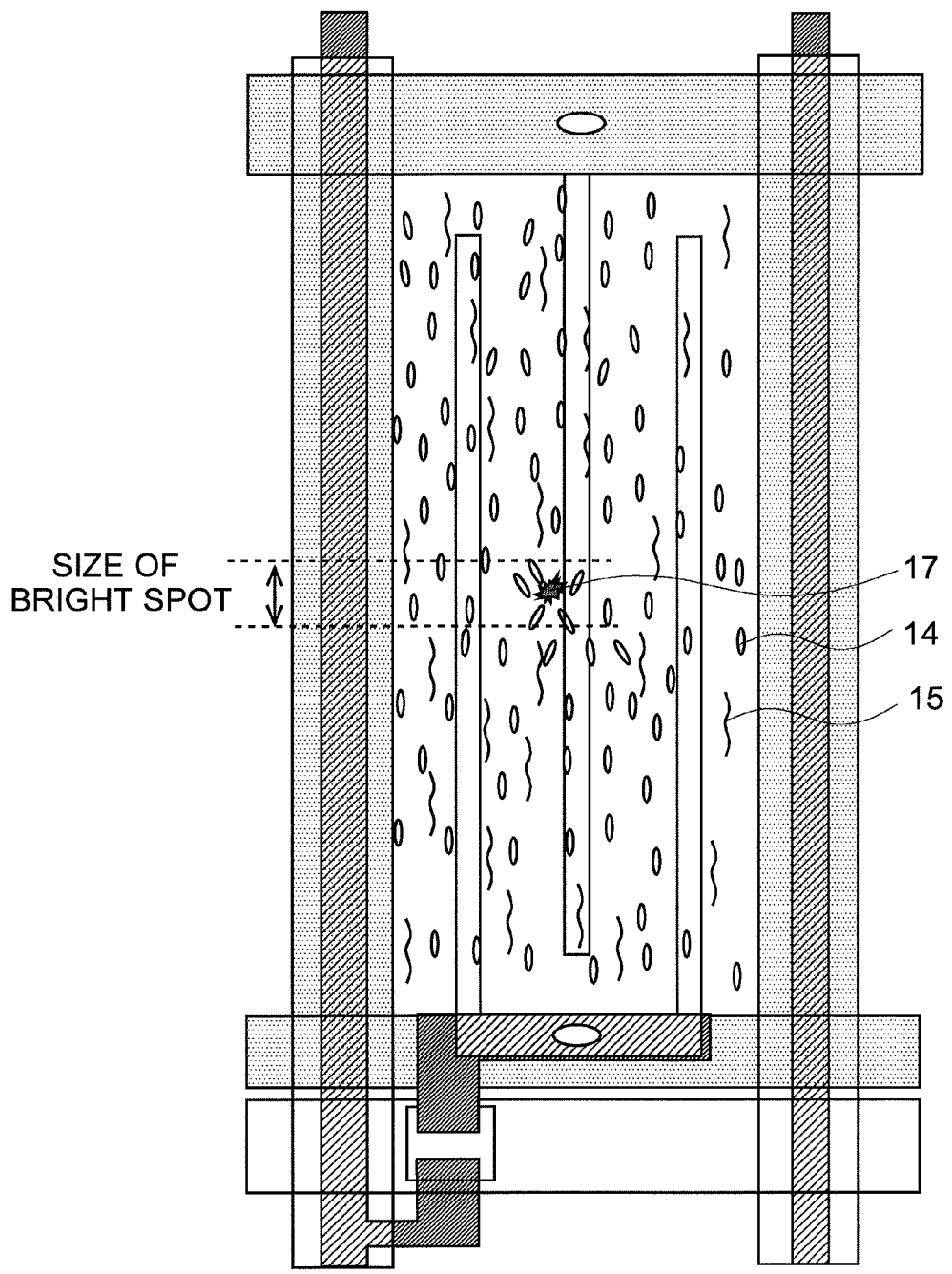
FIG. 2C is a schematic diagram of a liquid crystal panel according to Example 2 for illustrating molecular chains on the surface of the foreign matter after irradiation of the liquid crystal panel with non-polarized ultraviolet rays.
Figure 2C:
Figure 2D:
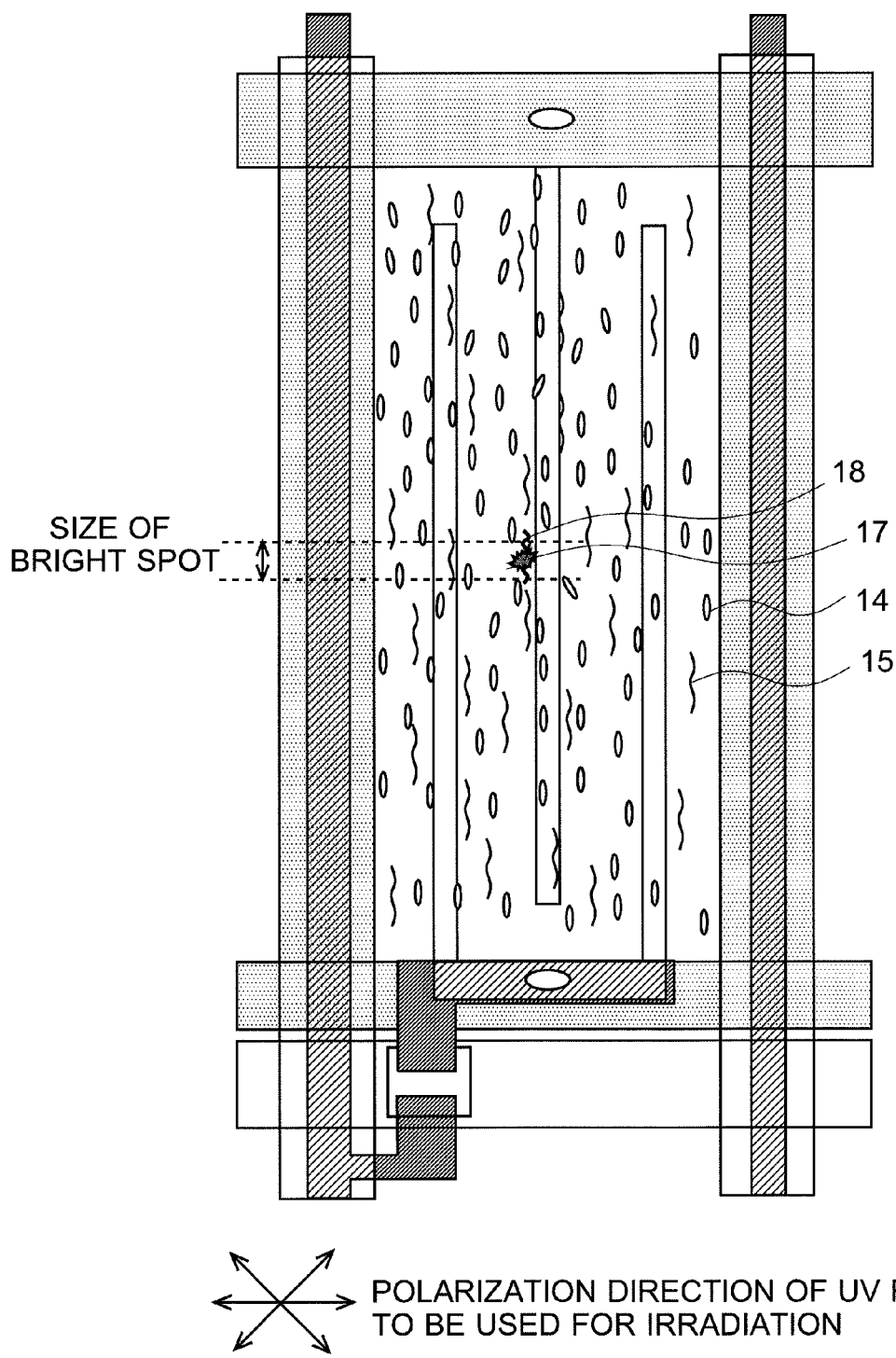
FIG. 2D is a schematic diagram of a liquid crystal panel according to Example 2 for illustrating molecular chains on the surface of the foreign matter after irradiation of the liquid crystal panel with linear-polarized ultraviolet rays.

Next, a liquid crystal panel and a method of manufacturing the liquid crystal panel according to Example 2 will be described with reference to FIGS. 2A to 2D. FIGS. 2A and 2B are schematic diagrams illustrating molecular chains that are on the surface of the foreign matter and cause orientation abnormality and orientation directions of liquid crystal. FIG. 2C is a schematic diagram illustrating molecular chains on the surface of the foreign matter after irradiation of the liquid crystal panel with non-polarized ultraviolet rays. FIG. 2D is a schematic diagram illustrating molecular chains on the surface of the foreign matter after irradiation of the liquid crystal panel with linear-polarized ultraviolet rays.

The liquid crystal panel according to the present example has a feature that the irradiating ultraviolet rays 41 for modifying the bright spot defect are linear polarized ultraviolet rays. Except for this feature, the liquid crystal panel according to the present example has the same arrangement as the liquid crystal panel of Example 1 described above. It should be noted that FIGS. 2A to 2D illustrate a case where the foreign matter 17 has transparency to ultraviolet rays 41 in the specific wavelength range. However, the liquid crystal panel according to the present example is not limited to this and the foreign matter 17 may not be transparent to ultraviolet rays 41 in the specific wavelength range.

First, a liquid crystal panel having a first transparent substrate 11, a second transparent substrate 12 and a liquid crystal layer 13 are prepared. The manufacturing method of the liquid crystal panel is the same as the manufacturing method described for Example 1.

Next, a defect inspection of the liquid crystal panel is carried out. Specifically, existence of the bright spot defect (orientation abnormality), the position where the bright spot defect (orientation abnormality) occurs, and the shape of the bright spot defect (orientation abnormality) of the liquid crystal panel are identified (confirmed), and when there is a bright spot defect, a hole 31 is formed using, for example, a UV laser, at a portion corresponding to the bright spot defect on an opposite surface of the first transparent substrate 11 (and/or the second transparent substrate 12) to the surface on which the liquid crystal layer 13 is formed.

Next, orientation of the liquid crystal molecules 14 in the circumference of the foreign matter 17 is controlled by irradiating the transparent substrate with ultraviolet rays 41 having wavelength less than or equal to 250 nm and cutting bonding of the molecular chains 18 on the surface of the foreign matter 17 that causes orientation abnormality.

At this time, irradiation with linear-polarized ultraviolet rays 41 is carried out in the present example. As illustrated in FIGS. 2A and 2B, the molecular chains of polyimide that form the oriented film 15 orient to a direction substantially parallel to the rubbing direction. Meanwhile, the molecular chains 18 on the surface of the foreign matter 17 that causes orientation abnormality orient in various directions, such as a direction different from the rubbing direction, and a parallel direction. Accordingly, the liquid crystal molecules 14 do not orient in a rubbing direction but rather orient in various directions.

As illustrated in FIG. 2C, when irradiating the molecular chains 18 on the surface of the foreign matter 17 that causes orientation abnormality with non-polarized ultraviolet rays 41, all of the molecular chains 18 in the circumference of the foreign matter 17 are cut. In addition, not only the molecular chains 18 in the circumference of the foreign matter 17, there is a possibility that the molecular chains of the oriented film 15 are cut. Meanwhile, when irradiating with linear-polarized ultraviolet rays 41, only the molecular chains 18 orienting in a direction that matches with the polarization direction absorb ultraviolet rays 41 and thus their bonding is cut.

Accordingly, as illustrated in FIG. 2D, by irradiating with linear-polarized ultraviolet rays 41, where the polarization direction is in a direction other than the rubbing direction, bonding of the molecular chains 18 orienting in a direction different from the rubbing direction are cut among the molecular chains 18 on the surface of the foreign matter 17, and thus it is possible to leave selectively bonding of the molecular chains 18 in directions parallel to the rubbing direction.

As a result, as compared to the case when irradiating with non-polarized ultraviolet rays 41 and cutting all of the molecular chains 18 in the circumference of the foreign matter 17, the liquid crystal molecules 14 can be easily arranged in the rubbing direction and the visual recognition level of the bright spot can be lowered more reliably. For example, the linear polarized ultraviolet rays 41 can be obtained by routing non-polarized ultraviolet rays 41 into, for example, a commercially-available wire grid polarizer.

After modifying the bright spot, the first polarization plate 21 and the second polarization plate 22 are adhered on the outer side of the first transparent substrate 11 and the second transparent substrate 12 (that is, the light-incident surface and the light-outgoing surface of the liquid crystal panel), and the adhesive material 23 of the first polarization plate 21 is filled in the excavated hole 31. Thus, the liquid crystal panel can be completed easily.

Example 3

Figure 3:
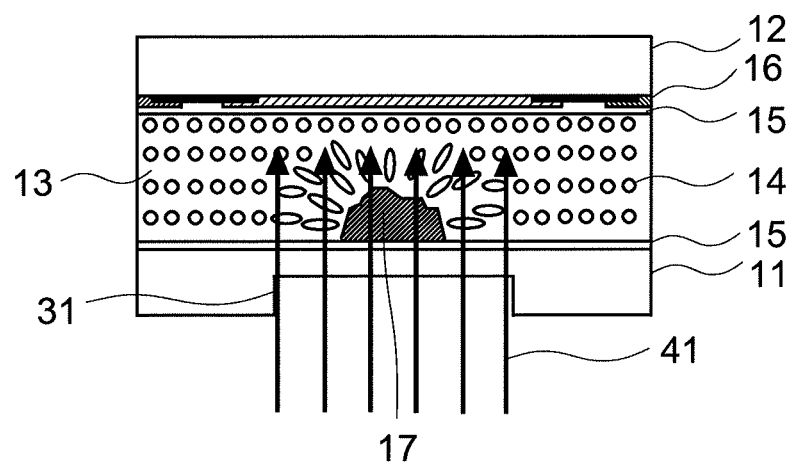
FIG. 3 is a schematic diagram of a liquid crystal panel according to Example 3 for illustrating a region to be irradiated with ultraviolet rays.

Next, a liquid crystal panel and a method of manufacturing the liquid crystal panel according to Example 3 will be described with reference to FIG. 3. FIG. 3 is a schematic diagram illustrating a region to be irradiated with ultraviolet rays.

The liquid crystal panel according to the present example has a feature of irradiating only a predetermined region with ultraviolet rays 41 for modifying the bright spot defect, where the predetermined region includes a portion of the liquid crystal panel that transmits ultraviolet rays 41 in the specific wavelength range. Except for this feature, the liquid crystal panel according to the present example has the same arrangement as the liquid crystal panel of Example 1 described above. It should be noted that FIG. 3 illustrates a case where the foreign matter 17 has transparency to ultraviolet rays 41 in the specific wavelength range. However, the liquid crystal panel according to the present example is not limited to this and the foreign matter 17 may not be transparent to ultraviolet rays 41 in the specific wavelength range.

First, a liquid crystal panel having a first transparent substrate 11, a second transparent substrate 12, and a liquid crystal layer 13 are prepared. The manufacturing method of the liquid crystal panel is the same as the manufacturing method described for Example 1.

Next, a defect inspection of the liquid crystal panel is carried out. Specifically, existence of the bright spot defect (orientation abnormality), the position where the bright spot defect (orientation abnormality) occurs, and the shape of the bright spot defect (orientation abnormality) of the liquid crystal panel are identified (confirmed), and when there is a bright spot defect, a hole 31 is formed using, for example, a UV laser, at a portion corresponding to the bright spot defect on an opposite surface of the first transparent substrate 11 (and/or the second transparent substrate 12) to the surface on which the liquid crystal layer 13 is formed.

Next, orientation of the liquid crystal molecules 14 in the circumference of the foreign matter 17 is controlled by irradiating the transparent substrate with ultraviolet rays 41 having wavelength less than or equal to 250 nm and cutting bonding of the molecular chains 18 on the surface of the foreign matter 17 that causes orientation abnormality.

At this time, as illustrated in FIG. 3, in the present example, a predetermined region including the hole 31 is irradiated with ultraviolet rays 41 for modifying the bright spot defect. For example, when bright spots of about one or two appear in one liquid crystal panel, or when a plurality of bright spots appear intensively on a portion on the liquid crystal panel, it is possible to reduce the operating time period by irradiating a predetermined region including the hole 31 as compared to irradiating the entire surface.

Examples of the light source of the irradiating ultraviolet rays 41 include a laser, a light emitting diode, and a mercury lamp. For example, when the bright spot portion is irradiated with ultraviolet rays 41 using a UV laser, irradiation with ultraviolet rays 41 in the specific wavelength range can be carried out so as to correspond with the size and the shape of the bright spot by adjusting the spot diameter and the shape using, for example, a slit.

After modifying the bright spot, the first polarization plate 21 and the second polarization plate 22 are adhered on the outer side of the first transparent substrate 11 and the second transparent substrate 12 (that is, the light-incident surface and the light-outgoing surface of the liquid crystal panel), and the excavated hole 31 is filled with the adhesive material 23 of the first polarization plate 21. Thus, the liquid crystal panel can be completed easily.

Example 4

Figure 4A:
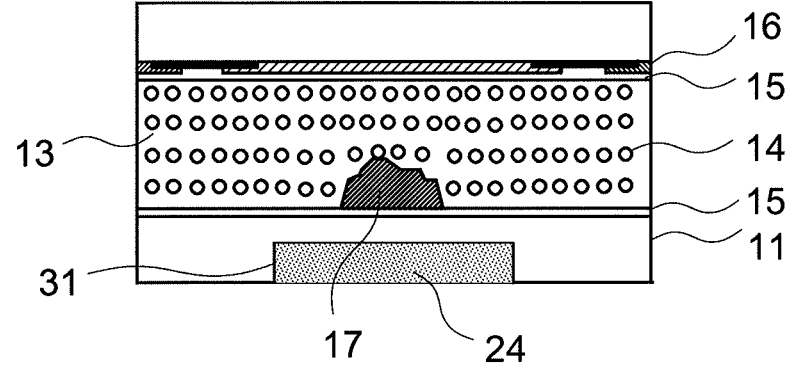
FIGS. 4A and 4B are diagrams illustrating a liquid crystal panel according to Example 4, where
Figure 4B:
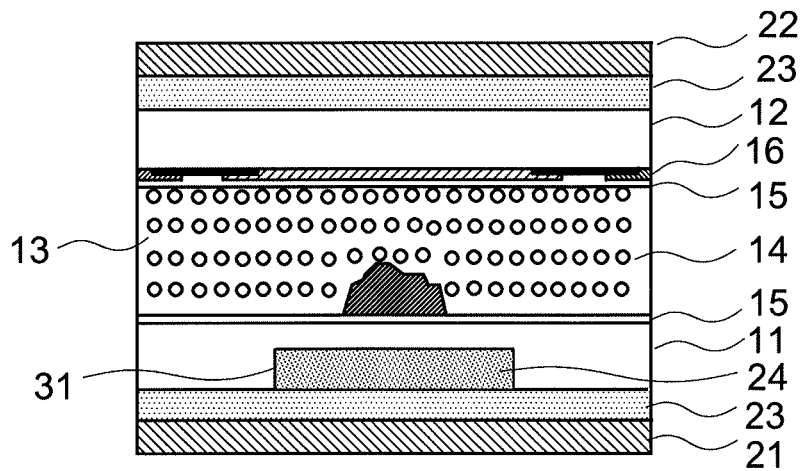

Next, a liquid crystal panel and a method of manufacturing the liquid crystal panel according to Example 4 will be described with reference to FIGS. 4A to 4B. FIG. 4A is a schematic diagram illustrating a method of filling a region that transmits ultraviolet rays in the specific wavelength range with substance that has transparency for light in the visible light region and has a refractive index different from that of the first transparent substrate 11 or the second transparent substrate 12 in the visible light region. FIG. 4B is a schematic diagram illustrating the liquid crystal panel after polarization plates are attached.

The liquid crystal panel according to the present example has a feature of including, after the step of irradiating with ultraviolet rays 41 in the specific wavelength range: a step of filling inside the hole 31 with a substance that is different in refractive index in visible light region from the corresponding one of the first transparent substrate 11 and the second transparent substrate 12 and is transparent to light in the visible light region; and a step of adhering the polarization plate thereafter. Except for this feature, the liquid crystal panel according to the present example has the same arrangement as the liquid crystal panel of Example 1 described above. It should be noted that FIGS. 4A to 4B illustrate a case where the foreign matter 17 has transparency to ultraviolet rays 41 in the specific wavelength range. However, the liquid crystal panel according to the present example is not limited to this and the foreign matter 17 may not be transparent to ultraviolet rays 41 in the specific wavelength range.

First, a liquid crystal panel having a first transparent substrate 11, a second transparent substrate 12, and a liquid crystal layer 13 are prepared. The manufacturing method of the liquid crystal panel is the same as the manufacturing method described for Example 1.

Next, a defect inspection of the liquid crystal panel is carried out. Specifically, existence of the bright spot defect (orientation abnormality), the position where the bright spot defect (orientation abnormality) occurs, and the shape of the bright spot defect (orientation abnormality) of the liquid crystal panel are identified (confirmed), and when there is a bright spot defect, a hole 31 is formed using, for example, a UV laser, at a portion corresponding to the bright spot defect on an opposite surface of the first transparent substrate 11 (and/or the second transparent substrate 12) to the surface on which the liquid crystal layer 13 is formed.

Next, orientation of the liquid crystal molecules 14 in the circumference of the foreign matter 17 is controlled by irradiating the transparent substrate with ultraviolet rays 41 having wavelength less than or equal to 250 nm and cutting bonding of the molecular chains 18 on the surface of the foreign matter 17 that causes orientation abnormality. As a result, the visual recognition level of the bright spot can be lowered.

At this time, as illustrated in FIG. 4A, in the present example, the inside of the hole 31 is filled with a substance (for example, resin 24) that is transparent to light in the visible light region and has a refractive index in the visible light region different from that of the first transparent substrate 11 or the second transparent substrate 12. The filled substance is cured by heating or irradiating ultraviolet rays 41. Thereafter, as illustrated in FIG. 4B, the first polarization plate 21 and the second polarization plate 22 are adhered on the outer side of the first transparent substrate 11 and the second transparent substrate 12 (that is, the light-incident surface and the light-outgoing surface of the liquid crystal panel).

When the light that has passed through the substance filled in the hole 31 enters at right angles to the first transparent substrate 11 or the second transparent substrate 12, reflectance R on the surface can be expressed by:

$$R = \frac{(n0 - n1)^2}{(n0 + n1)^2}, \quad (2)$$

where the refractive index of the first transparent substrate 11 or the second transparent substrate 12 is n0, and the refractive index of the substance filled in the hole 31 is n1. Accordingly, reflectance on the surface of the first transparent substrate 11 or second transparent substrate 12 is higher as the difference in refractive index between the substance filled in the hole 31 and the first transparent substrate 11 or the second transparent substrate 12 is larger.

When the first transparent substrate 11 or the second transparent substrate 12 is made of glass material, its refractive index is about 1.5. For example, if it is desired to make the refractive index of the substance filled in the hole 31 higher than that of the first transparent substrate 11 or the second transparent substrate 12, the hole is filled with a substance such as acrylic system resin, and if it is desired to be lower, the hole is filled with a substance such as fluorine based resin.

For example, if it is assumed that the refractive index of the substance filled in the hole 31 is 3.0, the reflectance is about 11%. Meanwhile, when the hole 31 is filled only with the adhesive material of the polarization plate, the refractive index of the adhesive material of the polarization plate is about 1.5, and thus is at the same level as the first transparent substrate 11 or the second transparent substrate 12. Accordingly, reflectance on the surface on the first transparent substrate 11 or the second transparent substrate 12 is less than or equal to about 0.1%.

Thus, the reflectance of light on the surface of the first transparent substrate 11 or second transparent substrate 12 is higher when the hole 31 is filled with a substance whose reflectance index is different from that of the first transparent substrate 11 or the second transparent substrate 12 as compared to the case where filling is done with only the adhesive material of the polarization plate. Therefore, transmittance of backlight light into the circumference of the foreign matter 17 can be reduced. Accordingly, for example, when the foreign matter 17 is transparent to light in the visible light region, the visual recognition level of the bright spot can be lowered more reliably.

Example 5

Figure 5A:
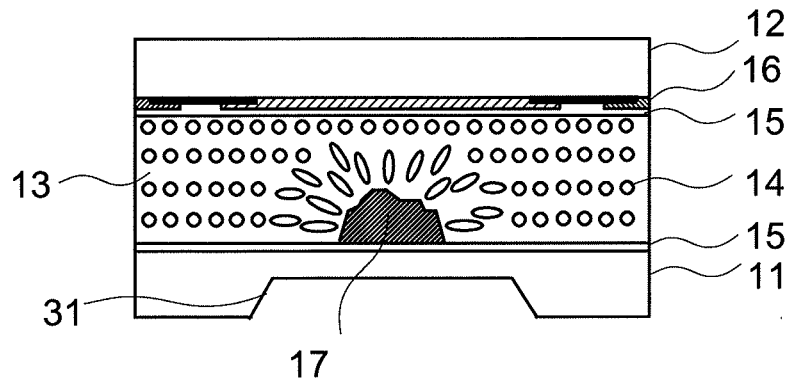
FIGS. 5A to 5C are diagrams illustrating a liquid crystal panel according to Example 5, where
Figure 5B:
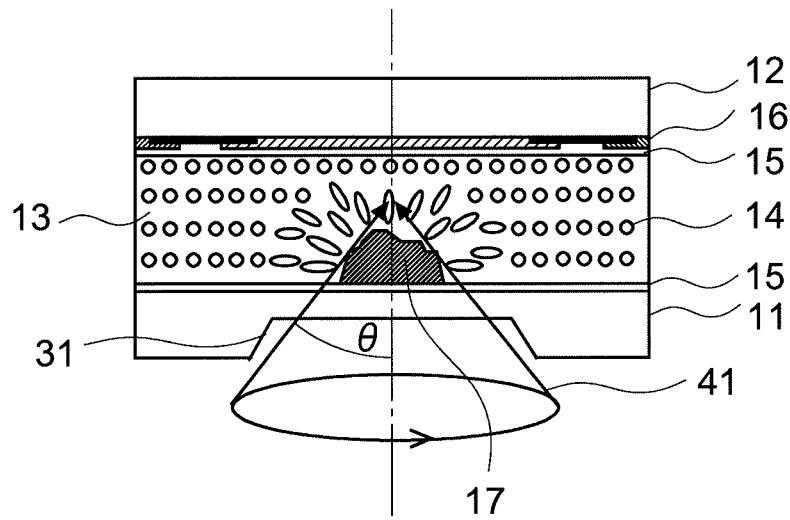
Figure 5C:
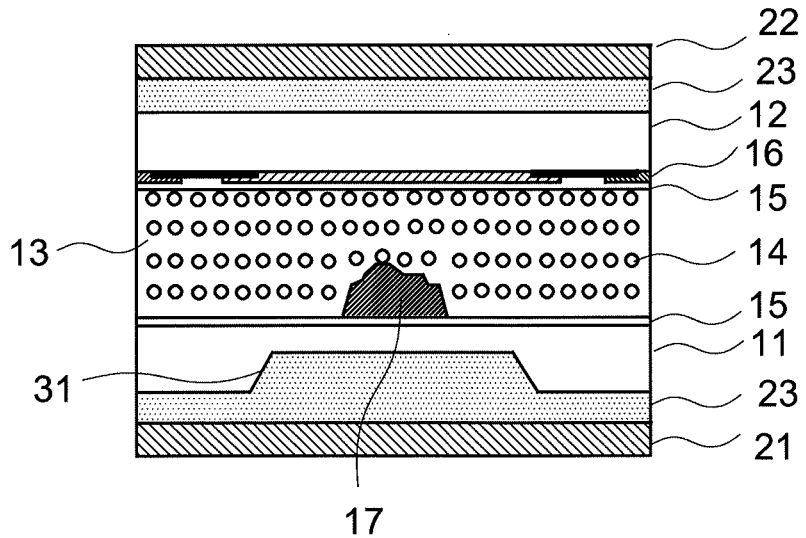

Next, a liquid crystal panel and a method of manufacturing the liquid crystal panel according to Example 5 will be described with reference to FIGS. 5A to 5C. FIG. 5A is a schematic diagram illustrating a region where ultraviolet rays in the specific wavelength range pass through. FIG. 5B is a schematic diagram illustrating a method of irradiating a bright spot portion with ultraviolet rays in the specific wavelength range. FIG. 5C is a schematic diagram illustrating a method of filling a region where ultraviolet rays in the specific wavelength range pass through with adhesive material of the polarization plate.

The liquid crystal panel according to the present example has a feature of the side surface extending in the depth direction of the hole 31, which is a region where ultraviolet rays 41 in the specific wavelength range is transmitted, inclining with respect to the axial direction (normal direction) of the substrate surface, and irradiation with ultraviolet rays 41 in the specific wavelength range being carried out such that the incident angle θ (that is, the angle of the optical axis of the ultraviolet rays) is formed with the axial direction of the substrate surface. Except for this feature, the liquid crystal panel according to the present example has the same arrangement as the liquid crystal panel of Example 1 described above. It should be noted that FIGS. 5A to 5C illustrate a case where the foreign matter 17 does not have transparency to ultraviolet rays 41 in specific wavelength range. However, the liquid crystal panel according to the present example is not limited to this and the foreign matter 17 may be transparent to ultraviolet rays 41 in the specific wavelength range.

First, a liquid crystal panel having a first transparent substrate 11, a second transparent substrate 12, and a liquid crystal layer 13 are prepared. The manufacturing method of the liquid crystal panel is the same as the manufacturing method described for Example 1.

Next, a defect inspection of the liquid crystal panel is carried out. Specifically, existence of the bright spot defect (orientation abnormality), the position where the bright spot defect (orientation abnormality) occurs, and the shape of the bright spot defect (orientation abnormality) of the liquid crystal panel are identified (confirmed), and when there is a bright spot defect, a hole 31 is formed using, for example, a UV laser, at a portion corresponding to the bright spot defect on an opposite surface of the first transparent substrate 11 (and/or the second transparent substrate 12) to the surface on which the liquid crystal layer 13 is formed.

At this time, as illustrated in FIG. 5A, in the present example, the side surface of the hole 31 extending in the depth direction is formed so as to incline with respect to the axial direction (normal direction) of the substrate surface. For example, when the hole 31 is formed using a UV laser, irradiation is carried out by inclining the incident angle of the UV laser with respect to the axial direction of the substrate surface. As a result, the side surface of the hole 31 extending in the depth direction is inclined from the axial direction of the substrate surface, and for example, a hole 31 having a shape of a flat-bottomed cone (truncated cone) is formed.

For forming the hole 31 having the above-described shape, the irradiation with the UV laser is carried out so that, when irradiation of the transparent substrate with ultraviolet rays is carried out in the succeeding process for cutting the molecular chains 18 on the surface of the foreign matter 17, the ultraviolet rays can efficiently hit the whole foreign matter 17 corresponding to the size of the foreign matter 17. In other words, the irradiation with the UV laser is carried out to form the hole 31 having a proper size and a side surface inclining at a proper angle with respect to the axial direction of the substrate surface for avoiding a deterioration of the transmittance of the ultraviolet rays, which are irradiated for cutting the molecular chains 18 and enter the hole 31, occurred because the ultraviolet rays hit a corner portion in the hole 31 formed by the transparent substrate (see FIG. 5B).

By forming the hole 31 in such a shape, more light entered from an oblique direction tends to irradiate on the surface of the foreign matter 17 when irradiating with ultraviolet rays 41 for cutting the molecular chains 18 on the surface of the foreign matter 17, and thus the entire side surface of the foreign matter 17 is irradiated with ultraviolet rays 41. Accordingly, for example, even when the foreign matter 17 is not transparent to ultraviolet rays 41 in the specific wavelength range, bonding of the molecular chains 18 on the surface of the foreign matter 17 that causes orientation abnormality over the entire side surface of the foreign matter 17 is cut, and thus the visual recognition level of the bright spot can be lowered more reliably.

Next, orientation of the liquid crystal molecules 14 in the circumference of the foreign matter 17 is controlled by irradiating the transparent substrate with ultraviolet rays 41 having wavelength less than or equal to 250 nm and cutting bonding of the molecular chains 18 on the surface of the foreign matter 17 that causes orientation abnormality.

As illustrated in FIG. 5B, in the present example, irradiation with ultraviolet rays 41 in the specific wavelength range, which is irradiated onto the hole 31, is carried out such that the incident angle θ is adjusted to incline with respect to the axial direction of the substrate surface. Since the hole 31 is formed such that the side surface extending in the depth direction is inclined from the axial direction of the substrate surface, the transmittance for ultraviolet rays 41 is higher when the incident angle θ of ultraviolet rays 41 is inclined from the axial direction of the substrate surface as compared to irradiating from the same direction as the axial direction of the substrate surface. Accordingly, the molecular chains 18 that cause orientation abnormality on the surface of the foreign matter 17 can be cut effectively.

At this time, the incident angle θ of ultraviolet rays 41 is made to incline from the axial direction of the substrate surface as greatly as possible such that irradiation with ultraviolet rays 41 is carried out onto the entire surface of the foreign matter 17 within the range where total reflection of light does not occur at, for example, the surface of the glass and the interface with the oriented film 15. At this time, there is a possibility that there is a portion where irradiation with ultraviolet rays 41 is not carried out by merely irradiating with the ultraviolet rays 41 from one direction. Accordingly, irradiation with ultraviolet rays 41 is carried out omnidirectionally with respect to the foreign matter 17 by rotating the substrates 360 degrees while keeping the angle formed by the optical axis of ultraviolet rays 41 and the substrate surface (or the normal direction of the substrate surface) constant such that irradiation with ultraviolet rays 41 is carried out onto the entire surface of the foreign matter 17.

Thereby, irradiation with ultraviolet rays 41 is carried out onto the entire surface of the foreign matter 17 and bonding of the molecular chains 18 that cause orientation abnormality on the surface of the foreign matter 17 is cut. The liquid crystal molecules 14 that orient by interacting with the molecular chains 18 on the surface of the foreign matter 17 are not affected by the molecular chains 18 on the surface of the foreign matter 17, and thus are controlled in a direction to which the liquid crystal material in a region without a foreign matter 17 orients. As a result, the difference in the light transmittance between the circumference of the foreign matter 17 and the portion without a foreign matter 17 becomes small, thereby lowering the visual recognition level of the bright spot. Thus, it is possible to improve image quality.

As illustrated in FIG. 5C, after modifying the bright spot, the first polarization plate 21 and the second polarization plate 22 are adhered on the outer side of the first transparent substrate 11 and the second transparent substrate 12 (that is, the light-incident surface and the light-outgoing surface of the liquid crystal panel), and the adhesive material 23 of the first polarization plate 21 is filled in the excavated hole 31. Thus, the liquid crystal panel can be completed easily.

Example 6

Figure 6A:
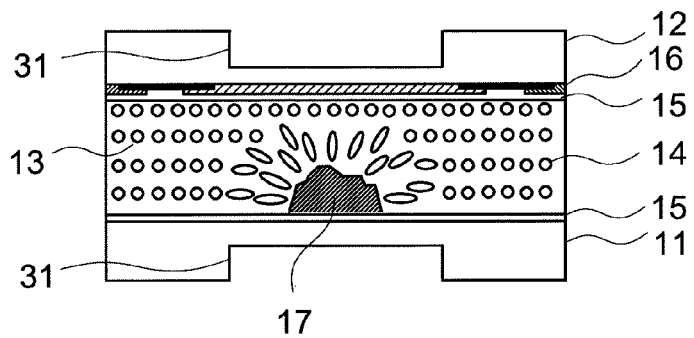
FIGS. 6A to 6D are diagrams illustrating a liquid crystal panel according to Example 6, where
Figure 6B:
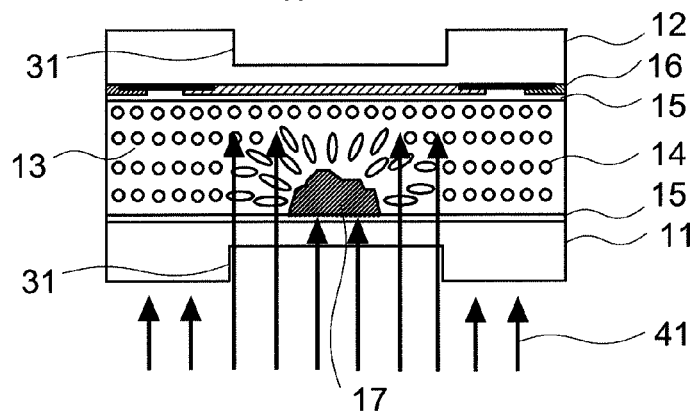
Figure 6C:
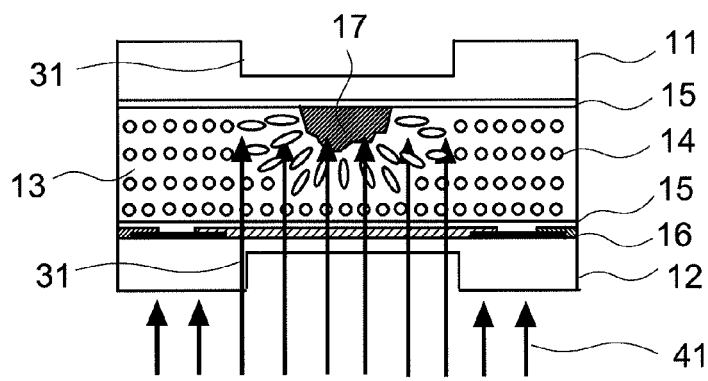
Figure 6D:
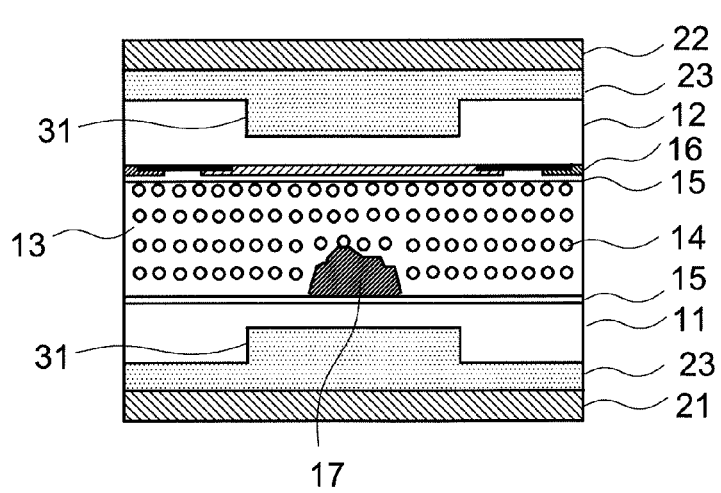
Figure 7:
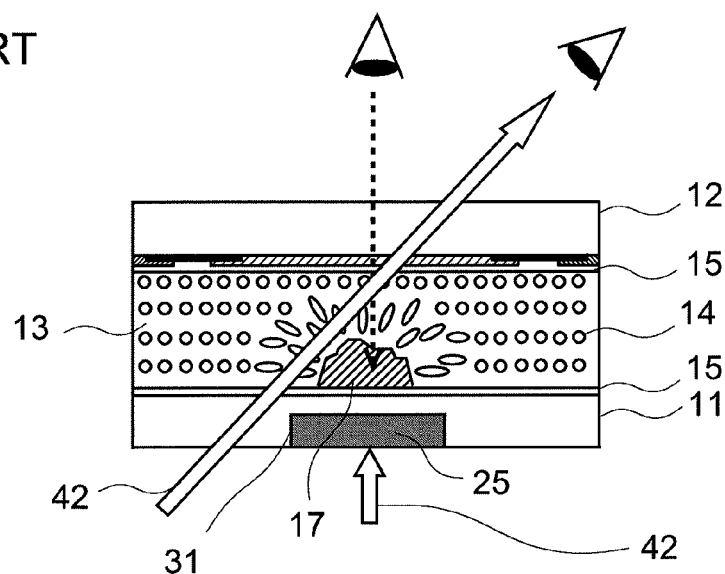
FIG. 7 is a schematic diagram for illustrating issues in conventional techniques.
Figure 8A:
FIGS. 8A and 8B are schematic diagrams for illustrating issues in conventional techniques, where
Figure 8B:

Next, a liquid crystal panel and a method of manufacturing the liquid crystal panel according to Example 6 will be described with reference to FIGS. 6A to 6D. FIG. 6A is a schematic diagram illustrating a region where ultraviolet rays in the specific wavelength range pass through. FIGS. 6B and 6C are schematic diagrams illustrating a method of irradiating the bright spot portion with ultraviolet rays in the specific wavelength range. FIG. 6D is a schematic diagram illustrating a method of filling a region where transmits ultraviolet rays in the specific wavelength range with adhesive material for the polarization plate.

The liquid crystal panel according to the present example has a feature of the hole 31, which is a region that transmits ultraviolet rays 41 in the specific wavelength range, being formed on both the first transparent substrate 11 and the second transparent substrate 12, and irradiation with the ultraviolet rays 41 in the specific wavelength range being carried out on both the first transparent substrate 11 and the second transparent substrate 12. Except for this feature, the liquid crystal panel according to the present example has the same arrangement as the liquid crystal panel of Example 1 described above. It should be noted that FIGS. 6A to 6D illustrate a case where the foreign matter 17 is not transparent to ultraviolet rays 41 in the specific wavelength range. However, the liquid crystal panel according to the present example is not limited to this and the foreign matter 17 may be transparent to ultraviolet rays 41 in the specific wavelength range.

First, a liquid crystal panel having a first transparent substrate 11, a second transparent substrate 12 and a liquid crystal layer 13 are prepared. The manufacturing method of the liquid crystal panel is the same as the manufacturing method described for Example 1.

Next, a defect inspection of the liquid crystal panel is carried out. Specifically, existence of the bright spot defect (orientation abnormality), the position where the bright spot defect (orientation abnormality) occurs, and the shape of the bright spot defect (orientation abnormality) of the liquid crystal panel are identified (confirmed), and when there is a bright spot defect, a hole 31 is formed on a portion corresponding to the bright spot defect on the outer side of the substrate. At this time, as illustrated in FIG. 6A, in the present example, holes 31 are formed using, for example, a UV laser, on a portion corresponding to the bright spot on both substrates of the first transparent substrate 11 and the second transparent substrate 12, respectively.

When the holes 31 are formed using a UV laser, first, one of the substrates of the first transparent substrate 11 or the second transparent substrate 12 is irradiated with a UV laser, and the hole 31 is formed. Thereafter, the other hole 31 is formed by reversing the substrates, and irradiating the portion corresponding to the bright spot of another substrate with a UV laser. As a result, the holes 31 are formed on the portions corresponding to the bright spot on both of a substrate of the first transparent substrate 11 and a substrate of the second transparent substrate 12.

Thus, by forming the hole 31 on the portion corresponding to the bright spot on each of the first transparent substrate 11 and the second transparent substrate 12, the surface of the foreign matter 17 can be irradiated with ultraviolet rays 41 from both sides of the substrates. Accordingly, for example, even when the foreign matter 17 is not transparent to ultraviolet rays 41 in the specific wavelength range, bonding of the molecular chains 18 on the surface of the foreign matter 17 that causes orientation abnormality over the entire side surface of the foreign matter 17 is cut, and thus the visual recognition level of the bright spot can be lowered more reliably.

Next, orientation of the liquid crystal molecules 14 in the circumference of the foreign matter 17 is controlled by irradiating the transparent substrate with ultraviolet rays 41 having wavelength less than or equal to 250 nm and cutting bonding of the molecular chains 18 on the surface of the foreign matter 17 that causes orientation abnormality. At this time, both the first transparent substrate 11 and the second transparent substrate 12 are irradiated with ultraviolet rays 41 in the specific wavelength range in the present example. Since the holes 31 are formed on both the first transparent substrate 11 and the second transparent substrate 12, both the first transparent substrate 11 and the second transparent substrate 12 transmit ultraviolet rays 41 in the specific wavelength range.

Accordingly, for example, even when the foreign matter 17 is not transparent to ultraviolet rays 41 in the specific wavelength range, irradiation with ultraviolet rays 41 in the specific wavelength range is carried out over the entire side surface of the foreign matter 17 by irradiating both the first transparent substrate 11 and the second transparent substrate 12 with ultraviolet rays 41 in the specific wavelength range, and thus the molecular chains 18 that cause orientation abnormality on the surface of the foreign matter 17 can be cut effectively.

For example, as illustrated in FIG. 6B, the hole 31 portion on the first transparent substrate 11 is first irradiated with ultraviolet rays 41. Thereafter, the surfaces of the substrates are reversed, and as illustrated in FIG. 6C, the hole 31 portion of the second transparent substrate 12 is irradiated with ultraviolet rays 41. As a result, the bright spot defect is modified, and thus image quality is improved.

As illustrated in FIG. 6D, after modifying the bright spot, the first polarization plate 21 and the second polarization plate 22 are adhered on the outer side of the first transparent substrate 11 and the second transparent substrate 12 (that is, the light-incident surface and the light-outgoing surface of the liquid crystal panel), and the excavated hole 31 is filled with the adhesive material 23 for the first polarization plate 21 and the second polarization plate 22. Thus, the liquid crystal panel can be completed easily.

It should be noted that the present invention should not be limited to the above-described embodiments and examples. Unless departing from the merits of the present invention, the arrangement of the liquid crystal panel, in particular, the shape and depth of the hole 31, the substance to be filled in the hole 31, the irradiation method of ultraviolet rays 41 in the specific wavelength range, can be modified as appropriate.

The invention claimed is:

1. A liquid crystal panel comprising:
a first transparent substrate;
a second transparent substrate; and a liquid crystal layer formed between the first transparent substrate and the second transparent substrate, wherein the first transparent substrate and the second transparent substrate have transparency in a visible light region and an ultraviolet absorptive property, and at least one of the first transparent substrate and the second transparent substrate comprises a structure arranged in a predetermined region thereof, the structure transmitting ultraviolet rays in a specific wavelength range, and the predetermined region corresponding to a location where an orientation abnormality occurs in the liquid crystal layer.

2. The liquid crystal panel of claim 1, wherein the specific wavelength range is a wavelength range in which energy of ultraviolet rays is higher than chemical bond energy of a molecular chain that is on a surface of a foreign matter existing in the predetermined region and that causes an orientation abnormality in the liquid crystal layer, and the structure is formed such that an orientation of a portion of the liquid crystal layer corresponding to the predetermined region is controlled by being irradiated with the ultraviolet rays in the specific wavelength range.

3. The liquid crystal panel of claim 1, wherein at least one of the first transparent substrate and the second transparent substrate comprises a hole as the structure, the hole being formed on a surface of the at least one of the first transparent substrate and the second transparent substrate at an opposite side to the liquid crystal layer.

4. The liquid crystal panel according to claim 3, wherein a thickness of each of the first transparent substrate and the second transparent substrate and a depth of the hole are set such that ultraviolet rays in a wavelength range being less than or equal to 250 nm pass through the predetermined region and are absorbed in regions of the first transparent substrate and the second transparent substrate other than the predetermined region.

5. The liquid crystal panel of claim 4, wherein the at least one of the first transparent substrate and the second transparent substrate is less than or equal to 0.2 mm in thickness in a portion where the hole exists.

6. The liquid crystal panel of claim 3, wherein the hole is filled with an adhesive material for fixing a polarization plate onto the at least one of the first transparent substrate and the second transparent substrate, the polarization plate being arranged at at least one of a light-incident surface and light-outgoing surface of the liquid crystal panel.

7. The liquid crystal panel of claim 3, wherein the hole is filled with a substance that
is transparent to light in a visible light region and
is different in a refractive index in the visible light region from the at least one of the first transparent substrate and the second transparent substrate.

8. The liquid crystal panel of claim 3, wherein the hole is provided by excavating the at least one of the first transparent substrate and the second transparent substrate such that a side surface of the hole extends in a normal direction of a surface of the at least one of the first transparent substrate and the second transparent substrate.

9. The liquid crystal panel of claim 3, wherein the hole is provided by excavating the at least one of the first transparent substrate and the second transparent substrate such that a side surface of the hole inclines at a predetermined angle with respect to a normal direction of a surface of the at least one of the first transparent substrate and the second transparent substrate and an inner diameter of the hole gradually reduces as a depth becomes deeper.

10. The liquid crystal panel of claim 1, wherein the liquid crystal panel is a liquid crystal panel that works in an IPS mode.

11. A method of manufacturing a liquid crystal panel, comprising:

forming a liquid crystal layer between a first transparent substrate and a second transparent substrate, the first transparent substrate and the second transparent substrate having transparency in a visible light region and an ultraviolet absorptive property;

forming a structure that transmits ultraviolet rays in a specific wavelength range in a predetermined region on at least one of the first transparent substrate and the second transparent substrate, and the predetermined region corresponding to a location where an orientation abnormality occurs in the liquid crystal layer; and irradiating a portion of the liquid crystal layer corresponding to the predetermined region with the ultraviolet rays in the specific wavelength range.

12. The method of claim 11, wherein the specific wavelength range is a wavelength range in which energy of ultraviolet rays is higher than chemical bond energy of a molecular chain that is on a surface of a foreign matter existing in the predetermined region and that causes an orientation abnormality in the liquid crystal layer, and the irradiating the portion of the liquid crystal layer comprises controlling orientation of the portion of the liquid crystal layer corresponding to the predetermined region by irradiating the portion with the ultraviolet rays in the specific wavelength range.

13. The method of claim 11, wherein the forming the structure comprises forming a hole on a surface of the at least one of the first transparent substrate and the second transparent substrate at an opposite side to the liquid crystal layer.

14. The method of claim 13, wherein the irradiating the portion of the liquid crystal layer comprises irradiating an entire surface of at least one of the first transparent substrate and the second transparent substrate or the predetermined region on the at least one of the first transparent substrate and the second transparent substrate, with the ultraviolet rays in the specific wavelength range.

15. The method of claim 14, wherein the irradiating the portion of the liquid crystal layer comprises irradiating the portion of the liquid crystal layer with non-polarized ultraviolet rays.

16. The method of claim 14, wherein the forming the liquid crystal layer comprises carrying out orientation treatment for orienting the liquid crystal layer, and
the irradiating the portion of the liquid crystal layer comprises irradiating the portion of the liquid crystal layer with linear-polarized ultraviolet rays polarized in a direction other than an orientation direction of the orientation treatment.

17. The method of claim 13 further comprising, after the irradiating the portion of the liquid crystal layer,
   filling the hole with an adhesive material for fixing a polarization plate to the at least one of the first transparent substrate and the second transparent substrate, the polarization plate being arranged at at least one of a light-incident surface and light-outgoing surface of the liquid crystal panel.

18. The method of claim 13, further comprising, after the irradiating the portion of the liquid crystal layer,
   filling the hole with a substance that
      is transparent to light in a visible light region and
      is different in a refractive index in the visible light region from the at least one of the first transparent substrate and the second transparent substrate.

19. The method of claim 11, further comprising, after the forming the liquid crystal layer and before the forming the structure,
   confirming an existence of an orientation abnormality in the liquid crystal layer, a location where the orientation abnormality occurs, and a shape of the orientation abnormality.

20. The method of claim 13,
   wherein the forming the structure comprises forming the hole by excavating the at least one of the first transparent substrate and the second transparent substrate to form a side surface of the hole extending in a normal direction of a surface of the at least one of the first transparent substrate and the second transparent substrate, and
   the irradiating the portion of the liquid crystal layer comprises irradiating the portion of the liquid crystal layer with the ultraviolet rays in the specific wavelength range with adjusting an optical axis of the ultraviolet rays or an angle of the at least one of the first transparent substrate and the second transparent substrate so as to make a direction of the optical axis and a normal direction of a surface of the at least one of the first transparent substrate and the second transparent substrate the same.

21. The method of claim 13,
   wherein the forming the structure comprises forming the hole by excavating the at least one of the first transparent substrate and the second transparent substrate to form a side surface of the hole inclining at a predetermined angle with respect to a normal direction of a surface of the at least one of the first transparent substrate and the second transparent substrate and to gradually reduce an inner diameter of the hole as a depth becomes deeper, and
   the irradiating the portion of the liquid crystal layer comprises irradiating the portion of the liquid crystal layer with the ultraviolet rays in the specific wavelength range with adjusting an optical axis of the ultraviolet rays or an angle of the at least one of the first transparent substrate and the second transparent substrate so as to incline the optical axis at a predetermined angle with respect to the normal direction of a surface of the at least one of the first transparent substrate and the second transparent substrate.

22. The method of claim 21,
   wherein the irradiating the portion of the liquid crystal layer comprises irradiating at least one of the first transparent substrate and the second transparent substrate with the ultraviolet rays in the specific wavelength range omnidirectionally by rotating the first transparent substrate and the second transparent substrate while maintaining a state where the optical axis of the ultraviolet rays in the specific wavelength range inclines at the predetermined angle with respect to the normal direction of a surface of the at least one of the first transparent substrate and the second transparent substrate.

\* \* \* \* \*